(12) United States Patent  
Saijo et al.

(10) Patent No.: US 7,779,767 B2  
(45) Date of Patent: Aug. 24, 2010

(54) FIRING FURNACE AND POROUS CERAMIC MEMBER MANUFACTURING METHOD

(75) Inventors: Takamitsu Saijo, Ibi-gun (JP); Yuichi Hiroshima, Ibi-gun (JP); Tatsuya Koyama, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 1290 days.

(21) Appl. No.: 11/145,986

(22) Filed: Jun. 7, 2005

(65) Prior Publication Data

US 2006/0029898 A1  Feb. 9, 2006

(30) Foreign Application Priority Data

Aug. 4, 2004  (JP) .............................. 2004-228649  
Jan. 28, 2005  (WO) ................. PCT/JP2005/001264  
Feb. 10, 2005  (WO) ................. PCT/JP2005/002073

(51) Int. Cl.  
*F23M 5/00* (2006.01)

(52) U.S. Cl. ........................................ 110/336; 32/120

(58) Field of Classification Search ................. 110/336; 219/390, 553; 432/120  
See application file for complete search history.

(56) References Cited

U.S. PATENT DOCUMENTS

| | | | |
|---|---|---|---|
| 4,850,576 A | 7/1989 | Hack et al. | |
| 5,303,660 A | 4/1994 | Lauersdorf | |
| 5,914,187 A | 6/1999 | Naruse et al. | |
| 5,930,994 A | 8/1999 | Shimato et al. | |
| 6,447,564 B1 | 9/2002 | Ohno et al. | |
| 6,565,630 B2 | 5/2003 | Ohno et al. | |
| 6,669,751 B1 | 12/2003 | Ohno et al. | |
| 6,770,116 B2 | 8/2004 | Kojima | |
| 7,427,309 B2 | 9/2008 | Ohno et al. | |
| 7,438,967 B2 | 10/2008 | Fujita | |
| 7,341,614 B2 | 11/2008 | Hayashi et al. | |
| 7,449,427 B2 | 11/2008 | Ohno et al. | |
| 7,462,216 B2 | 12/2008 | Kunieda et al. | |
| 7,473,465 B2 | 1/2009 | Ohno et al. | |
| 2003/0111462 A1 | 6/2003 | Sato et al. | |
| 2004/0031264 A1 | 2/2004 | Kojima | |
| 2004/0033175 A1 | 2/2004 | Ohno et al. | |

(Continued)

FOREIGN PATENT DOCUMENTS

CN    2281987    5/1998

(Continued)

OTHER PUBLICATIONS

U.S. Appl. No. 10/506,438, filed Mar. 22, 2005, Taoka et al.

(Continued)

*Primary Examiner*—Carlos Lopez  
(74) *Attorney, Agent, or Firm*—Oblon, Spivak, McClelland, Maier & Neustadt, L.L.P.

(57) ABSTRACT

A firing furnace comprising: a muffle formed so as to ensure a space for housing a formed body to be fired; a member that constitutes a heat generator and is placed on and/or around the muffle; and a heat insulating layer that contains said muffle and said heat generator inside thereof, wherein a carbon-natured sheet is placed in the vicinity of corner portions of an inner face of said heat insulating layer.

22 Claims, 8 Drawing Sheets

U.S. PATENT DOCUMENTS

| | | |
|---|---|---|
| 2004/0055265 A1 | 3/2004 | Ohno et al. |
| 2004/0161596 A1 | 8/2004 | Taoka et al. |
| 2004/0223892 A1 | 11/2004 | Kojima |
| 2005/0011174 A1 | 1/2005 | Hong et al. |
| 2005/0016140 A1 | 1/2005 | Komori et al. |
| 2005/0016141 A1 | 1/2005 | Hong et al. |
| 2005/0076626 A1 | 4/2005 | Kudo et al. |
| 2005/0102987 A1 | 5/2005 | Kudo |
| 2005/0109023 A1 | 5/2005 | Kudo et al. |
| 2005/0115224 A1 | 6/2005 | Kojima |
| 2005/0153099 A1 | 7/2005 | Yamada |
| 2005/0159310 A1 | 7/2005 | Ohno et al. |
| 2005/0161849 A1 | 7/2005 | Ohno et al. |
| 2005/0169818 A1 | 8/2005 | Ohno et al. |
| 2005/0169819 A1 | 8/2005 | Shibata |
| 2005/0175514 A1 | 8/2005 | Ohno |
| 2005/0176581 A1 | 8/2005 | Ohno et al. |
| 2005/0178098 A1 | 8/2005 | Ono et al. |
| 2005/0180898 A1 | 8/2005 | Yamada |
| 2005/0214504 A1 | 9/2005 | Yoshida |
| 2005/0229565 A1 | 10/2005 | Yoshida |
| 2005/0247038 A1 | 11/2005 | Takahashi |
| 2005/0272602 A1 | 12/2005 | Ninomiya |
| 2006/0019061 A1 | 1/2006 | Oshimi |
| 2006/0029897 A1 | 2/2006 | Saijo et al. |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0059877 A1 | 3/2006 | Yoshida |
| 2006/0108347 A1 | 5/2006 | Koyama et al. |
| 2006/0118546 A1 | 6/2006 | Saijo |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2006/0245465 A1 | 11/2006 | Saijo et al. |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0068128 A1 | 3/2007 | Oshimi et al. |
| 2007/0116908 A1 | 5/2007 | Ohno et al. |
| 2007/0128405 A1 | 6/2007 | Sakaguchi et al. |
| 2007/0130897 A1 | 6/2007 | Sakaguchi et al. |
| 2007/0148403 A1 | 6/2007 | Yamamura et al. |
| 2007/0152382 A1 | 7/2007 | Yamada et al. |
| 2007/0169453 A1 | 7/2007 | Haykawa |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0204580 A1 | 9/2007 | Kunieda |
| 2007/0212517 A1 | 9/2007 | Ohno et al. |
| 2007/0235895 A1 | 10/2007 | Yamamura et al. |
| 2007/0262497 A1 | 11/2007 | Yamamura et al. |
| 2007/0262498 A1 | 11/2007 | Saijo et al. |
| 2007/0293392 A1 | 12/2007 | Ohno et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0116200 A1 | 5/2008 | Kawai et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0157445 A1 | 7/2008 | Kawai et al. |
| 2008/0174039 A1 | 7/2008 | Saijo et al. |
| 2008/0190081 A1 | 8/2008 | Oshimi |
| 2008/0190083 A1 | 8/2008 | Oshimi |
| 2008/0197544 A1 | 8/2008 | Saijo et al. |
| 2008/0211127 A1 | 9/2008 | Naruse et al. |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0079111 A1 | 3/2009 | Kasai et al. |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| CN | 1269390 A | 10/2000 |
| CN | 1352375 A | 6/2002 |
| CN | 1438975 A | 8/2003 |
| DE | 30 38 864 A1 | 5/1982 |
| DE | 86 17 516 | 8/1994 |
| EP | 0 175 878 | 4/1986 |
| JP | 61-289288 | 12/1986 |
| JP | 61-295303 | 12/1986 |
| JP | 63-302291 | 12/1988 |
| JP | 63-302292 | 12/1988 |
| JP | 1-123991 | 5/1989 |
| JP | 1-167584 | 7/1989 |
| JP | 1-290562 | 11/1989 |
| JP | 2-153864 | 6/1990 |
| JP | 2-140299 | 11/1990 |
| JP | 9-201 | 4/1997 |
| JP | 10-52618 | 2/1998 |
| JP | 10-141859 | 5/1998 |
| JP | 10-238961 | 9/1998 |
| JP | 2001-48657 | 2/2001 |
| JP | 2001-183070 | 7/2001 |
| JP | 2002-20173 | 1/2002 |
| JP | 2002-20174 | 1/2002 |
| JP | 2002-97076 | 4/2002 |
| JP | 2002-249385 | 9/2002 |
| JP | 2003-314964 | 11/2003 |

OTHER PUBLICATIONS

U.S. Appl. No. 10/502,044, filed Jan. 24, 2005, Taoka et al.
U.S. Appl. No. 10/513,798, filed Nov. 18, 2004, Kunieda et al.
U.S. Appl. No. 10/515,179, filed Jul. 19, 2005, Yamada.
U.S. Appl. No. 10/515,181, filed Nov. 26, 2004, Komori et al.
U.S. Appl. No. 10/514,560, filed Jun. 29, 2005, Ohno et al.
U.S. Appl. No. 10/516,328, filed Dec. 14, 2004, Komori et al.
U.S. Appl. No. 10/518,373, filed Dec. 28, 2004, Ohno et al.
U.S. Appl. No. 10/518,548, filed Jan. 3, 2005, Takahashi.
U.S. Appl. No. 10/521,592, filed Jan. 18, 2005, Ohno et al.
U.S. Appl. No. 11/145,986, filed Jun. 7, 2005, Saijo et al.
U.S. Appl. No. 11/174,483, filed Jul. 6, 2005, Saijo et al.
U.S. Appl. No. 10/527,531, filed Mar. 11, 2005, Ogyu et al.
U.S. Appl. No. 10/530,561, filed Apr. 7, 2005, Komori et al.
U.S. Appl. No. 11/174,726, filed Jul. 6, 2005, Ohno et al.
U.S. Appl. No. 11/867,256, Kabayashi, et al.
U.S. Appl. No. 12/363,396, Sato.
U.S. Appl. No. 12/369,876, Sato.
U.S. Appl. No. 12/334,226, Mizuno, et al.
U.S. Appl. No. 12/400,389, Higuchi.
U.S. Appl. No. 12/342,903, Ohno.
U.S. Appl. No. 12/393,200, Saijo.
U.S. Appl. No. 12/411,148, Hiroshima.

Cross-section on B-B line

FIRING FURNACE AND POROUS CERAMIC MEMBER MANUFACTURING METHOD

CROSS-REFERENCE TO RELATED APPLICATIONS

This application claims benefit of priority to Japanese Patent Application No. 2004-228649, filed on Aug. 4, 2004, PCT Application No. PCT/JP2005/001264, filed on Jan. 28, 2005, and PCT Application No. PCT/JP2005/002073, filed on Feb. 10, 2005.

The contents of those Applications are incorporated herein by reference in their entirety.

BACKGROUND OF THE INVENTION

1. Field of the Invention

The present invention relates to: a firing furnace that is used for manufacturing a honeycomb structural body made of ceramics, a ceramic material and the like; a porous ceramic member manufacturing method using the same; and a porous ceramic member manufactured by the manufacturing method.

2. Discussion of the Background

There have been proposed various exhaust gas purifying honeycomb filters and catalyst supporting members which are used for purifying exhaust gases discharged from internal combustion engines of vehicles such as a bus, a truck and the like, construction machines and the like.

With respect to the exhaust gas purifying honeycomb filters and the like, there has been used a honeycomb structural body which is constituted by a non-oxide based ceramic porous body such as silicon carbide and has a superior heat resistance.

Conventionally, for example, JP-A 2001-48657 and JP-A 63-302291 have disclosed firing furnaces used for manufacturing non-oxide based ceramic members of this type.

The firing furnace to be used for manufacturing such non-oxide ceramic members is provided with a heater and the like in the furnace and a heat insulating layer mainly made of carbon.

In the case where a porous ceramic member made of silicon carbide is manufactured by using the above-mentioned firing furnace, since a formed body after a degreasing process is heated and fired at a high temperature of 1400° C. or more, gases including silicon carbide, silicon, SiO gases and the like are discharged into an ambient atmosphere inside the firing furnace, and these gases react with carbon members inside the firing furnace to be converted into silicon carbide and the like.

When the carbon members are converted into silicon carbide, there arises a difference in physical property such as thermal expansion coefficient between a surface layer of the heat insulating layer made of silicon carbide and an inner layer made of carbon. Thus, warping tends to occur in the heat insulating layer. Moreover, in combination with the conversion into silicon carbide and the like, reaction of carbon with oxygen remaining inside the furnace or with oxygen and the like generated from the formed body causes corrosion in the heat insulating layer.

When warping and corrosion occur in the heat insulating layer, the heat insulating performance is lowered, or separation or the like occurs in the heat insulating layer, making the firing furnace unable to function as a furnace; consequently, the heat insulating layer needs to be exchanged. However, changing the heat insulating layer requires high costs, resulting in a problem of high manufacturing costs.

Moreover, even if the heat insulating layer does not need to be changed, an efficient heating process is no longer available and firing costs increase when the heat insulating property of the firing furnace is deteriorated.

The contents of Japanese Patent Laid-Open Publication No. 2001-48657 and Japanese Patent Laid-Open Publication No. 1988-302291 are incorporated herein by reference in their entirety.

SUMMARY OF THE INVENTION

A first aspect of the present invention is related to a firing furnace comprising: a muffle formed so as to ensure a space for housing a formed body to be fired; a member that constitutes a heat generator and is placed on and/or around the muffle; and a heat insulating layer that contains the muffle and the heat generator inside thereof. Herein, a carbon-natured sheet is placed in the vicinity of corner portions of an inner face of the heat insulating layer.

In the firing furnace according to the first aspect of the present invention, the carbon-natured sheet may be placed on inner upper and lower faces of the heat insulating layer, may be placed on inner side faces of the heat insulating layer, or may be placed on entire inner faces of the heat insulating layer. Moreover, the carbon-natured sheet is desirably made of a graphite sheet, a carbon fiber composite (C/C composite) or a carbon cloth.

In the firing furnace according to the first aspect of the present invention, the carbon-natured sheet is desirably secured to an inner face of the heat insulating layer by using an adhesive (in particular, an inorganic adhesive) or a combining member. In the case where the carbon-natured sheet is secured to the inner face of the heat insulating layer by using the combining member, the combining member desirably has a density of at least about 2 pcs/m$^2$ and at most about 100 pcs/m$^2$ per unit area.

A second aspect of the present invention is related to a firing furnace comprising: a muffle formed so as to ensure a space for housing a formed body to be fired; a member that constitutes a heat generator and is placed on and/or around the muffle; and a heat insulating layer that contains the muffle and the heat generator inside thereof. Herein, the heat insulating layer is secured to a heat insulating layer attaching-enclosing member that is located on the periphery of the heat insulating layer by using a combining member.

In the firing furnace according to the second aspect of the present invention, the combining member desirably has a density of at least about 4 pcs/m$^2$ and at most about 200 pcs/m$^2$ per unit area.

A third aspect of the present invention is related to a firing furnace comprising: a muffle formed so as to ensure a space for housing a formed body to be fired; a member that constitutes a heat generator and is placed on and/or around the muffle; and a heat insulating layer that contains the muffle and the heat generator inside thereof. Herein, the heat insulating layer is divided into a plurality of heat insulating layers, while a reinforcing member that combines and reinforces the divided insulating layers arranged therein.

In the firing furnace according to the third aspect of the present invention, a carbon-natured sheet may be placed in the vicinity of corner portions of an inner face of the heat insulating layer, may be placed on inner upper and lower faces of the heat insulating layer, may be placed on inner side faces of the heat insulating layer, or may be placed on entire inner faces of the heat insulating layer. The reinforcing member is desirably made of a carbon fiber composite or graphite. Moreover, the carbon-natured sheet is desirably made of a graphite sheet, a carbon fiber composite (C/C composite) or a carbon cloth.

In the firing furnace according to any one of the first to third aspects of the present invention, the member that constitutes the heat generator is desirably a heater or a muffle.

A fourth aspect of the present invention is related to a porous ceramic member manufacturing method, upon firing a formed body to form a porous ceramic member, said method using a firing furnace that comprises: a muffle formed so as to ensure a space for housing the formed body to be fired; a member that constitutes a heat generator and is placed on and/or around the muffle; and a heat insulating layer that contains the muffle and the heat generator inside thereof. Herein, a carbon-natured sheet is placed in the vicinity of corner portions of an inner face of the heat insulating layer.

In the porous ceramic member manufacturing method according to the fourth aspect of the present invention, the carbon-natured sheet of the firing furnace may be placed on inner upper and lower faces of the heat insulating layer, may be placed on inner side faces of the heat insulating layer, or may be placed on entire inner faces of the heat insulating layer. Moreover, the carbon-natured sheet is desirably made of a graphite sheet, a carbon fiber composite (C/C composite) or a carbon cloth.

In the porous ceramic member manufacturing method according to the fourth aspect of the present invention, the carbon-natured sheet of the firing furnace is desirably secured to an inner face of the heat insulating layer by using an adhesive (in particular, an inorganic adhesive) or a combining member. In the case where the carbon-natured sheet is secured to the inner face of the heat insulating layer by using the combining member, the combining member desirably has a density of at least about 2 pcs/m$^2$ and at most about 100 pcs/m$^2$ per unit area.

A fifth aspect of the present invention is related to a porous ceramic member manufacturing method, upon firing a formed body to form a porous ceramic member, the method using a firing furnace that comprises: a muffle formed so as to ensure a space for housing a formed body to be fired; a member that constitutes a heat generator and is placed on and/or around the muffle; and a heat insulating layer that contains the muffle and the heat generator inside thereof. Herein, the heat insulating layer is secured to a heat insulating layer attaching-enclosing member that is located on the periphery of the heat insulating layer by using a combining member.

In the porous ceramic member manufacturing method according to the fifth aspect of the present invention, the combining member of the firing furnace desirably has a density of at least about 4 pcs/m$^2$ and at most about 200 pcs/m$^2$ per unit area.

A sixth aspect of the present invention is related to a porous ceramic member manufacturing method, upon firing a formed body to form a porous ceramic member, said method using a firing furnace that comprises: a muffle formed so as to ensure a space for housing the formed body to be fired; a member that constitutes a heat generator and is placed on and/or around the muffle and a heat insulating layer that contains the muffle and the heat generator inside thereof. Herein, the heat insulating layer is divided into a plurality of heat insulating layers, while a reinforcing member that combines and reinforces the divided insulating layers is arranged therein.

In the porous ceramic member manufacturing method according to the sixth aspect of the present invention, a carbon-natured sheet of the firing furnace may be placed at least in the vicinity of corner portions of an inner face of the heat insulating layer, may be placed on inner upper and lower faces of the heat insulating layer, may be placed on inner side faces of the heat insulating layer, or may be placed on entire inner faces of the heat insulating layer. The reinforcing member is desirably made of a carbon fiber composite or graphite. Moreover, the carbon-natured sheet is desirably made of a graphite sheet, a carbon fiber composite (C/C composite) or a carbon cloth.

In the porous ceramic member manufacturing method according to any one of the fourth to sixth aspects of the present invention, the member that constitutes the heat generator is a heater or a muffle.

A seventh aspect of the present invention is related to a porous ceramic member manufactured by firing a formed body, wherein the porous ceramic member is manufactured by, upon firing the formed body, using a firing furnace that comprises: a muffle formed so as to ensure a space for housing the formed body to be fired; a member that constitutes a heat generator and is placed on and/or around the muffle; and a heat insulating layer that contains the muffle and the heat generator inside thereof, in which a carbon-natured sheet is placed in the vicinity of corner portions of an inner face of the heat insulating layer.

An eighth aspect of the present invention is related to a porous ceramic member manufactured by firing a formed body, wherein the porous ceramic member is manufactured by, upon firing the formed body, using a firing furnace that comprises: a muffle formed so as to ensure a space for housing the formed body to be fired; a member that constitutes a heat generator and is placed on and/or around the muffle; and a heat insulating layer that contains the muffle and the heat generator inside thereof, in which the heat insulating layer is secured to a heat insulating layer attaching-enclosing member that is located on the periphery of the heat insulating layer by using a combining member.

A ninth aspect of the present invention is related to a porous ceramic member manufactured by firing a formed body, wherein the porous ceramic member is manufactured by, upon firing the formed body, using a firing furnace that comprises: a muffle formed so as to ensure a space for housing the formed body to be fired; a member that constitutes a heat generator and is placed on and/or around the muffle; and a heat insulating layer that contains the muffle and the heat generator inside thereof, in which the heat insulating layer is divided into a plurality of heat insulating layers while a reinforcing member that combines and reinforces the divided insulating layers is arranged therein.

DESCRIPTION OF THE EMBODIMENTS

According to the first aspect of the present invention, a firing furnace comprises: a muffle formed so as to ensure a space for housing a formed body to be fired; a member that constitutes a heat generator and is placed on and/or around the muffle; and a heat insulating layer that contains the muffle and the heat generator inside thereof. Herein, a carbon-natured sheet is placed in the vicinity of corner portions of an inner face of the heat insulating layer.

According to a second aspect of the present invention, a firing furnace comprises: a muffle formed so as to ensure a space for housing a formed body to be fired; a member that constitutes a heat generator and is placed on and/or around the muffle; and a heat insulating layer that contains the muffle and the heat generator inside thereof. Herein, the heat insulating layer is secured to a heat insulating layer attaching-enclosing member that is located on the periphery of the heat insulating layer by using a combining member.

The first aspect of the present invention does not have the limitation that the heat insulating layer is secured to the heat insulating layer attaching-enclosing member that is located on the periphery of the heat insulating layer by using the combining member. In contrast, the second aspect of the present invention does not have the limitation that the carbon-natured sheet is placed in the vicinity of the corner portions of the inner face of the heat insulating layer. Thus, the respective aspects of the present invention are different from each other in these points. However, the other members are formed in the same manner. Accordingly, the explanation will be given of both of the firing furnace according to the first aspect of the present invention and the firing furnace according to the second aspect of the present invention.

Figure 1:
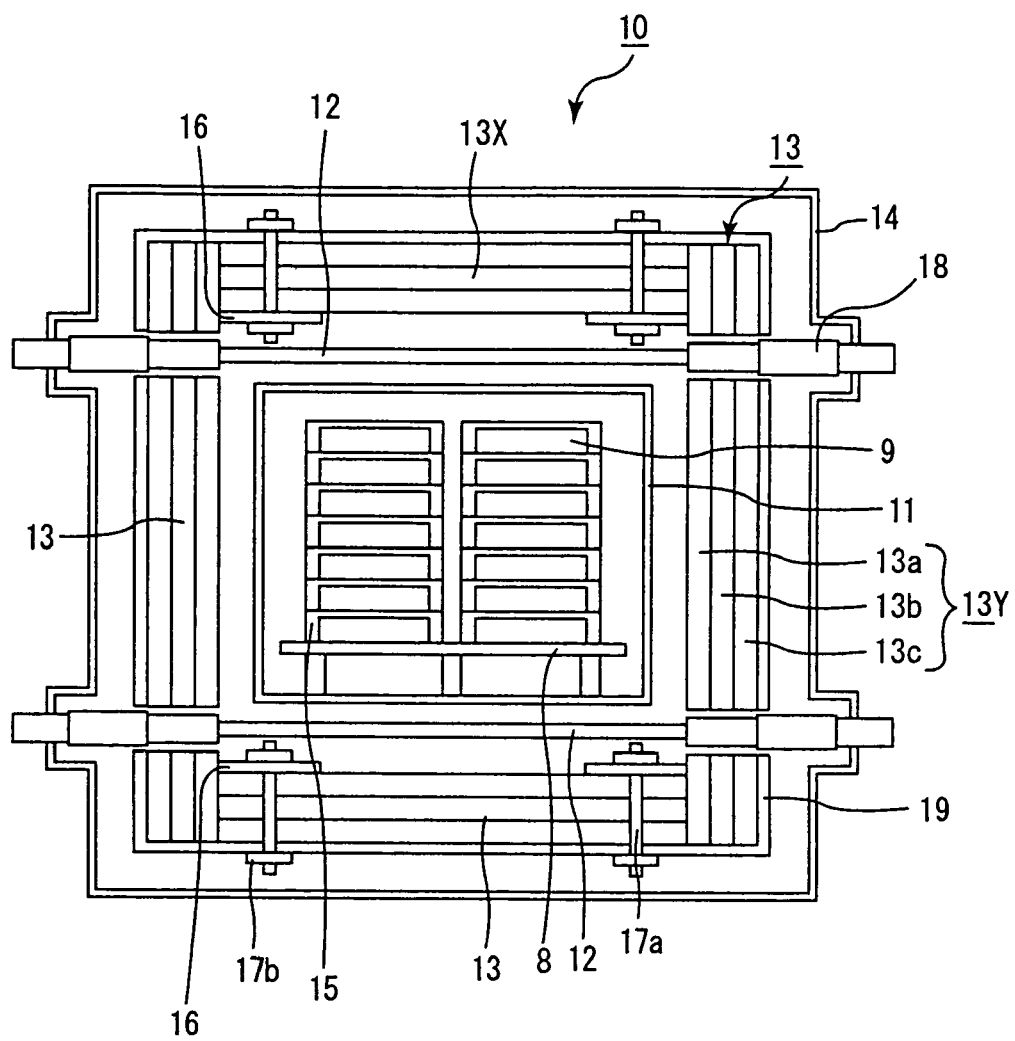
FIG. 1 is a cross-sectional view that schematically shows one example of a firing furnace according to a first or second aspect of the present invention.
Figure 2:
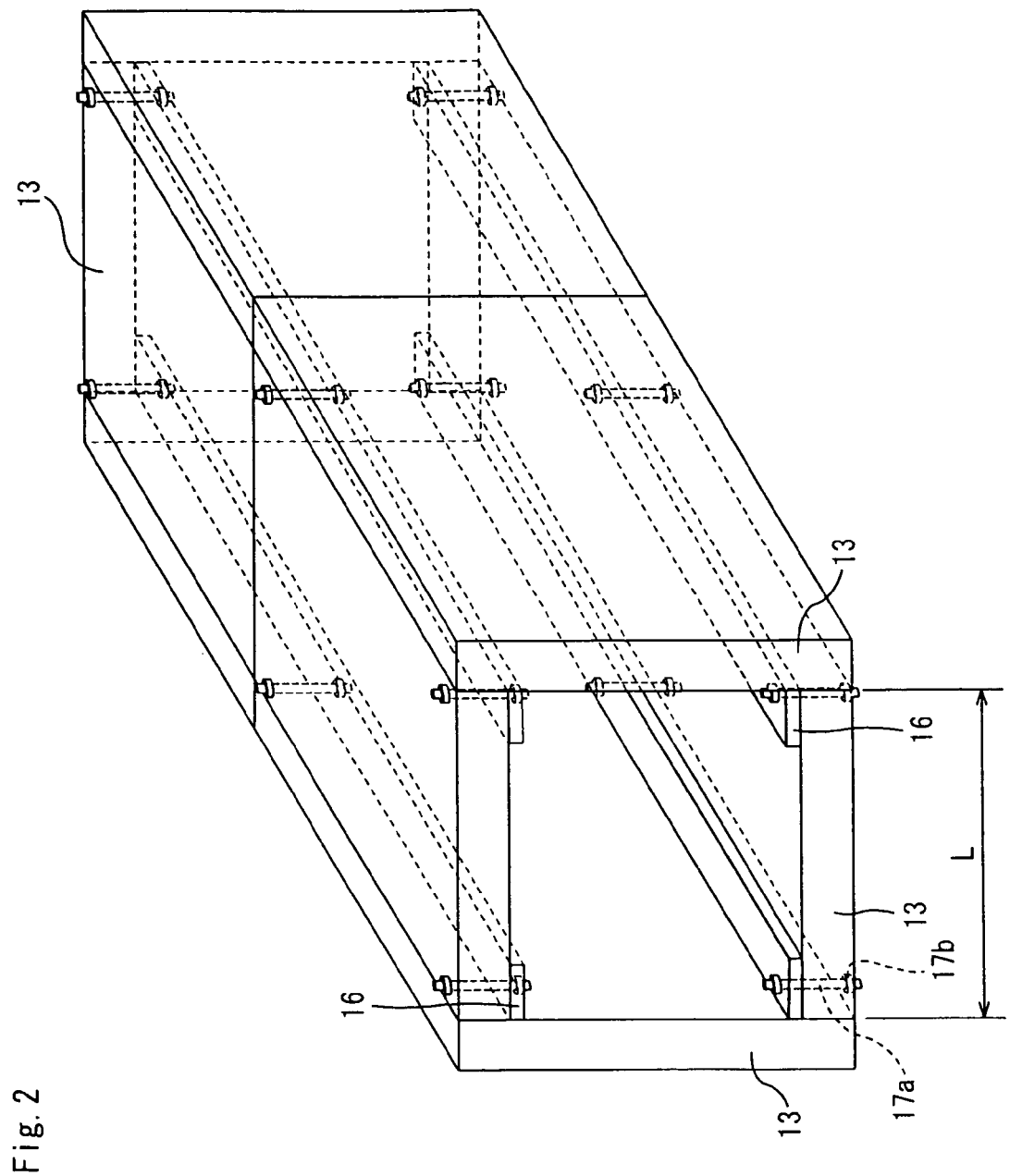
FIG. 2 is a perspective view that schematically shows a heat insulating layer portion that forms the firing furnace shown in FIG. 1.

FIG. 1 is a cross-sectional view that schematically shows the firing furnace according to the first or second aspect of the present invention, and FIG. 2 is a perspective view that schematically shows a heat insulating layer constituting the firing furnace shown in FIG. 1. Here, in FIG. 2, a heat insulating layer attaching-enclosing member 19 and the like are not shown.

This firing furnace 10 comprises: a muffle 11 formed so as to ensure a space for housing a formed body to be fired; a heater 12 that constitutes a heat generator placed around the muffle 11; and a heat insulating layer 13 (13X, 13Y) that contains the muffle 11 and the heater 12 inside thereof. A furnace wall 14 made of metal is formed on the outermost side so as to be separated from the ambient atmosphere. The furnace wall 14 may be constituted by a cooling jacket. In other words, the furnace wall 14 may be formed by a metal member or the like, and also have a double structure, with water allowed to flow the inside thereof, so that the temperature of the furnace wall 14 is maintained within a predetermined range.

The entire floor portion of the muffle 11 is supported by a supporting member (not shown) so that a supporting base (cart) 8 on which a laminated body of jigs for firing 15 in which formed bodies 9 to be fired are placed is allowed to pass. Heaters 12 made of graphite or the like are placed on the upper and lower portions of the muffle 11. The heaters 12 are connected to an outside power supply (not shown) through terminals 18.

A heat insulating layer 13 (13X, 13Y) constituted by three layers, that is, carbon members 13a, 13b and ceramic fibers 13c that are successively laminated in this order from the inner side is further formed outside the heater 12. A carbon-natured sheet 16 is placed on inside end portions (in the vicinity of corner portions) of the upper and lower heat insulating layers 13X. The heat insulating layer 13 on which this carbon-natured sheet 16 has been placed is secured to a heat insulating layer attaching-enclosing member 19 placed on the periphery of the heat insulating layer 13 through bolts 17a and nuts 17b made of carbon, which serve as combining members.

In FIG. 1, the left end of the carbon sheet 16 on the left side and the right end of the carbon sheet 16 on the right side are made in contact with the heat insulating layers 13Y placed on the right and left side faces. In the present invention, this mode is desirably used; however, the ends of these carbon sheets 16 may be placed slightly apart from the heat insulating layers 13Y.

The inner surface of the heat insulating layer 13 is covered with the carbon-natured sheet 16 because of the following reasons. In particular, in the case where a porous ceramic member made of silicon carbide is manufactured, since a carbon member 13a located on the inner side is mainly made of carbon fibers, an inside portion close to the formed body is converted into silicon carbide due to silicon carbide, silicon, SiO gas and the like generated upon firing. When carbon has been converted into silicon carbide, there arises a difference in physical property such as thermal expansion coefficient between the surface layer made of silicon carbide and the inner layer made of carbon of the carbon member 13a constituting the heat insulating layer 13, so that warping is caused in the heat insulating layer. Therefore, in order to prevent the occurrence of warping (reaction) in the heat insulating layer due to the above-mentioned reaction, the inner surface thereof is covered with the carbon-natured sheet 16.

As shown in FIG. 1, the inner surface thereof is covered with the carbon-natured sheet 16, the carbon-natured sheet 16 is secured to the surface of the heat insulating layer 13 by the bolts 17a and nuts 17b, and the heat insulating layer 13 itself is tightly fastened (the heat insulating layer 13 is secured to the heat insulating layer attaching-enclosing member 19) so that it becomes possible to prevent the carbon member 13a and the like from being converted into silicon carbide through a reaction and also to prevent the warping of the carbon member 13a and the like mechanically.

The carbon-natured sheet 16 may be bonded to the inner surface of the heat insulating layer 13 by using an adhesive or the like; however, as shown in FIG. 1, it becomes possible to more effectively prevent the warping of the heat insulating layer 13 by tightly fastening the heat insulating layer 13 by using the combining members 17 (bolts 17a, nuts 17b).

In the firing furnace having the above-mentioned structure, upon manufacturing porous ceramic members such as oxide ceramics, carbide ceramics other than silicon carbide, nitride ceramics and the like, it is also possible to prevent the warping of the heat insulating layer due to changes in physical properties such as thermal expansion coefficient and the like.

Here, in the firing furnace 10 shown in FIG. 1, the heat insulating layers 13X placed on the upper and lower portions are not extended to the end portions so that four corner portions of the heat insulating layer 13 are formed by the heat insulating layers 13Y that are placed on the right and left side faces. Thus, the end portions (corner portions) in the heat insulating layers 13Y placed on the right and left sides are secured by the heat insulating layers 13X placed on the upper and lower portions. As a result, the heat insulating layers 13Y placed on the right and left sides are less likely to generate warping in which the center portion is formed into a convex portion outward. However, the heat insulating layers 13X placed on the upper and lower portions are likely to generate warping in which the center portion is formed into a convex portion outward, when left as it is. Therefore, the end portions (in the vicinity of corner portions) of the heat insulating layers 13 placed on the upper and lower portions are fixedly secured by using the carbon-natured sheets 16 and the combining members 17 so as to prevent the warping.

This firing furnace 10 is a continuous firing furnace in which the jig for firing 15 is gradually heated to a high temperature during the passage through it, and after having reached the highest temperature, the temperature is gradually lowered. For this reason, normally, for example, the length is desirably set to 10 m or more. Therefore, the length in the depth (length direction) of the heat insulating layer 13 is made considerably longer in comparison with the dimension of the cross section shown in FIG. 1.

As shown in FIG. 2, the carbon-natured sheets 16 are placed on the insides of the two ends of the upper and lower heat insulating layers 13 in the form of stripes. The length of the furnace is so long that the carbon-natured sheets 16 also have an elongated shape in the form of a stripe in the length direction. The carbon-natured sheet 16 may be prepared as a long and thin piece of the carbon-natured sheet 16 from the inlet to the outlet, or may be prepared as a plurality of carbon-natured sheets 16.

Here, the firing furnace may partially have an area having no heat insulating layer 13 in the length direction thereof. In this case, in the area having the heat insulating layer 13, the carbon sheet is placed on the inner face of the heat insulating layer in the mode as described above. However, in order to prevent SiO and the like generated from a formed body from scattering toward the furnace wall and the like, the carbon sheet may also be placed on the portion having no insulating layer 13 in the above-mentioned mode.

In the firing furnace 10 shown in FIG. 1, the carbon-natured sheet 16 is placed in the vicinity of corner portions on the inner face of the heat insulating layer 13; however, the carbon-natured sheet may be placed on inner upper and lower faces of the heat insulating layers, may be placed on inner side faces of the heat insulating layers, or may be placed on entire inner faces of the heat insulating layers.

FIGS. 3 to 7 are cross-sectional views that schematically show states where carbon sheets are placed on heat insulating layers that form the respective firing furnaces, and portions other than the heat insulating layer and the peripheral portion thereof are not shown; however, as shown in the figures, the modes of the insulating layers and the shapes and the attaching modes of the carbon sheets are different from each other.

Figure 3:
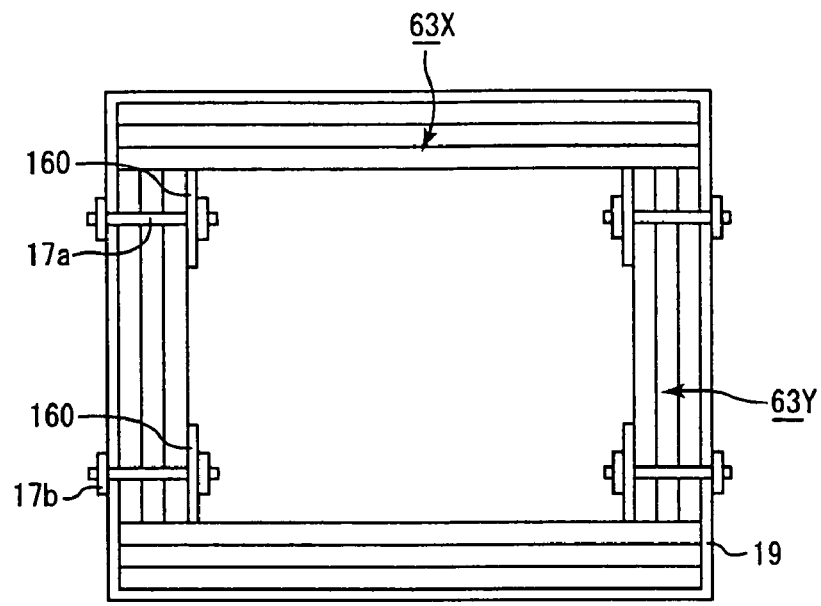
FIG. 3 is a cross-sectional view that schematically shows a state where carbon sheets are placed on heat insulating layers that form a firing furnace.

In heat insulating layers 63 (63X, 63Y) shown in FIG. 3, the heat insulating layers 63Y placed on the right and left side faces are not extended to upper and lower end portions, and the four corner portions of the heat insulating layers 63 are constituted by the heat insulating layers 63X that are placed on the upper and lower portions. Thus, in this mode, the end portions (corner portions) in the heat insulating layers 63X placed on the upper and lower portions are secured by the insulating layers 63Y placed on the right and left side faces. Consequently, the heat insulating layers 63X placed on the upper and lower portions are less likely to generate warping in which the center portion is formed into a convex portion outward. In contrast, the heat insulating layers 63Y placed on the right and left side faces are likely to generate warping in which the center portion is formed into a convex portion outward, when left as it is. Therefore, by using carbon sheets 160 and combining members 17 (17a, 17b), the end portions (in the vicinity of corner portions) of the heat insulating layers 63Y placed on the right and left sides are fixedly secured so that the occurrence of warping is prevented.

In FIG. 3, the upper end of the carbon sheet 160 on the upper side and the lower end of the carbon sheet 160 on the lower side are made in contact with the heat insulating layers 63X placed on the upper and lower sides. This mode is desirably used in the preset invention; however, the end portions of the carbon sheet 160 may be slightly separated from the heat insulating layers 63X.

Figure 4:
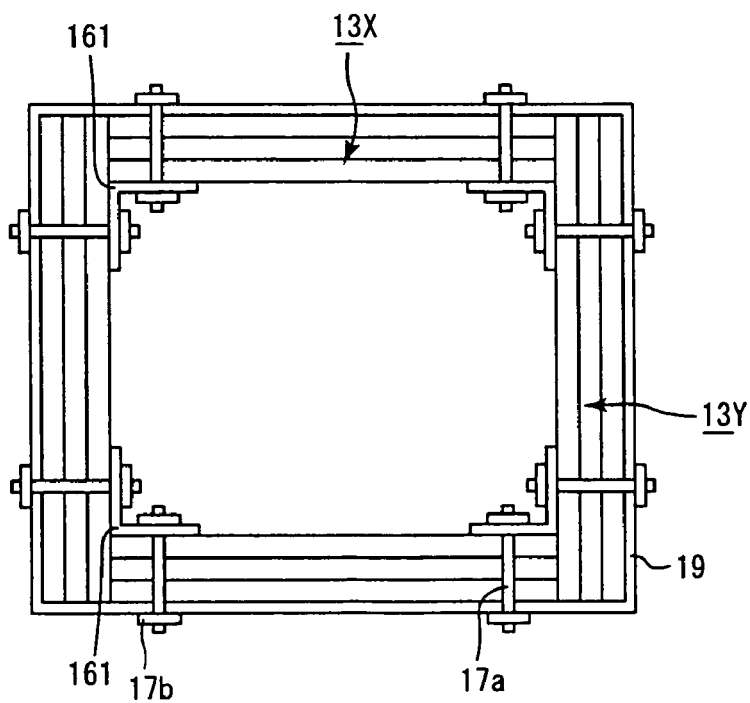
FIG. 4 is a cross-sectional view that schematically shows a state where carbon sheets are placed on heat insulating layers that form a firing furnace.

In heat insulating layers 13 (13X, 13Y) shown in FIG. 4 that have the same arrangement as the heat insulating layers 13 shown in FIG. 1, heat insulating layers 13X placed on the upper and lower sides are not extended to end portions. Here, carbon sheets 161, each having an approximately L-shape, are placed in the vicinity of the corner portions of the heat insulating layers 13, and fixedly secured by using the combining members 17 (17a, 17b) so that the occurrence of warping in the heat insulating layers 13X placed on the upper and lower sides is prevented. In the case where the carbon sheets 161 having a shape shown in FIG. 4 are used, the occurrence of warping in the heat insulating layers 63Y can be prevented even if the heat insulating layers are prepared as heat insulating layers 63 (63X, 63Y) in the mode shown in FIG. 3.

Figure 5:
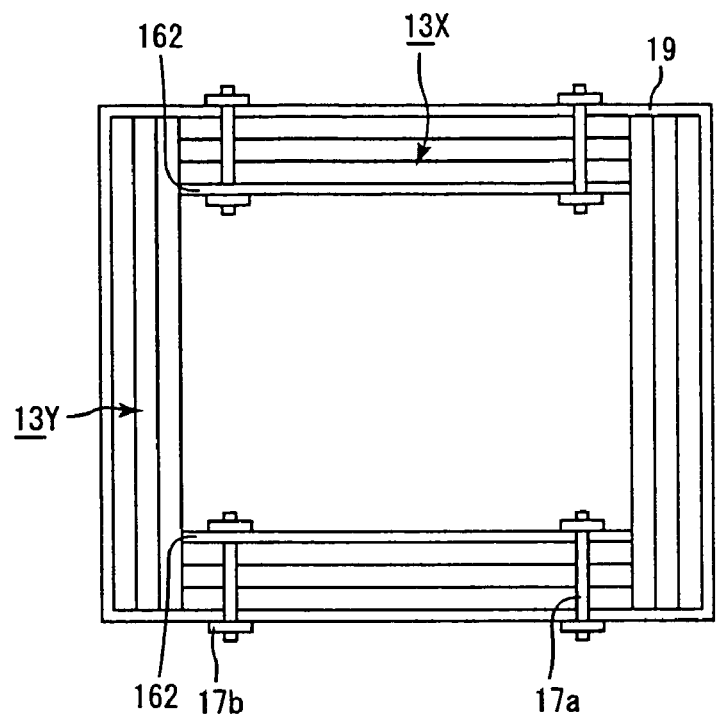
FIG. 5 is a cross-sectional view that schematically shows a state where carbon sheets are placed on heat insulating layers that form a firing furnace.

Since heat insulating layers 13 (13X, 13Y) shown in FIG. 5 have the same arrangement as the heat insulating layers 13 shown in FIG. 1, the explanation concerning the structure of the heat insulating layers 13 will not be given.

In these heat insulating layers 13, carbon sheets 162 are affixed over the entire portion of the heat insulating layers 13X placed on the upper and lower sides, and the right and left end portions (in the vicinity of corner portions) of the carbon sheet 162 are fixedly secured by using the combining members 17 (17a, 17b) so that the occurrence of warping in the insulating layers 13X placed on the upper and lower sides can be prevented.

Figure 6:
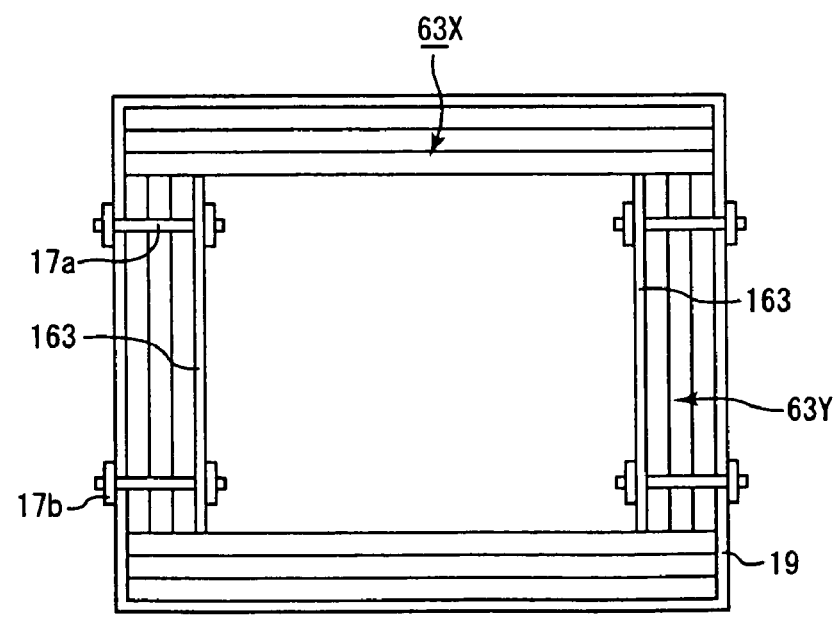
FIG. 6 is a cross-sectional view that schematically shows a state where carbon sheets are placed on heat insulating layers that form a firing furnace.

Heat insulating layers 63 (63X, 63Y) shown in FIG. 6 have the same arrangement as the heat insulating layers 63 shown in FIG. 3. In these heat insulating layers 63, carbon sheets 163 are affixed over the entire portion of the heat insulating layers 63Y placed on the right and left side faces, and the upper and lower end portions (in the vicinity of corner portions) are fixedly secured by using the combining members 17 (17a, 17b) so that the occurrence of warping in the heat insulating layers 63Y placed on the right and left side faces is prevented.

Figure 7:
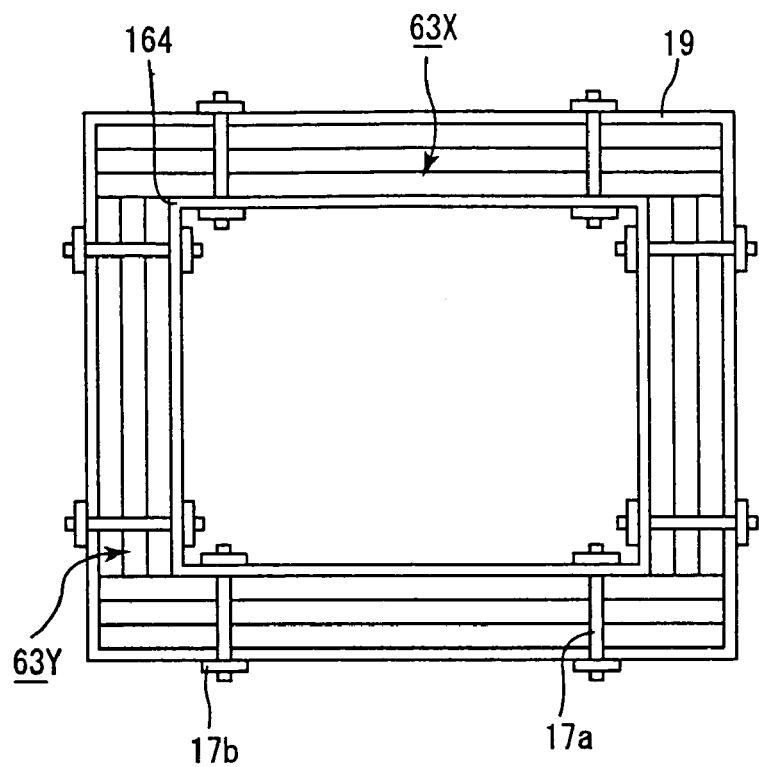
FIG. 7 is a cross-sectional view that schematically shows a state where carbon sheets are placed on heat insulating layers that form a firing furnace.

Heat insulating layers 63 (63X, 63Y) shown in FIG. 7 have the same arrangement as the heat insulating layers 63 shown in FIG. 3. In these heat insulating layers 63, carbon sheets 164 are affixed over the entire portion of the heat insulating layers 63 (63X, 63Y), with upper and lower end portions (in the vicinity of corner portions) and right and left end portions (in the vicinity of corner portions) fixedly secured by using the combining members 17 (17a, 17b), so that the occurrence of warping in the insulating layers 63Y placed on the right and left side faces is prevented.

As described above, upon placing a carbon sheet, since warping tends to occur in portions of those heat insulating layers that are not extended to the end portions among heat insulating layers, the occurrence of warping and the like in the heat insulating layers can be prevented by placing carbon sheets and/or fixing members at least in the vicinity of the corner portions of the heat insulating layers that are not extended to the end portions. In this case, in order to reduce corrosion in the heat insulating layers, greater area of the carbon sheet is more preferable, and, for example, the carbon sheets may be placed on the entire upper and lower inner faces, may be placed on the entire right and left inner faces of the heat insulating layers, or may be placed on the entire inner faces of the heat insulating layers.

The carbon-natured sheet refers to a sheet-shaped material mainly composed of carbon, and the sheet-shaped material is desirably made of a graphite sheet, a carbon fiber composite (C/C composite) or a carbon cloth.

The graphite sheet refers to a sheet mainly composed of graphite particles, and the density thereof is preferably at least about 0.1 g/cm$^3$ and at most about 5 g/cm$^3$. Moreover, the graphite sheet desirably has a thickness of at least about 0.05 mm and at most about 5 mm. In the case where a graphite sheet is placed in corner portions of the inner faces of heat insulating layers as shown in FIG. 2, the width of one graphite sheet is preferably at least about 5% and at most about 50% with respect to the width L (mm) of the heat insulating layers of the upper and lower sides.

The carbon fiber composite (C/C composite) refers to a composite of carbon particles and carbon fibers, and the bulk density thereof is preferably at least about 0.5 g/cm$^3$ and at most about 5 g/cm$^3$. Moreover, the thickness of the C/C composite is desirably at least about 0.5 mm and at most about 5 mm, and the width of a sheet of C/C composite is preferably at least about 5% and at most about 50% with respect to the width L (mm) of the heat insulating layers on the upper and lower sides, shown in FIG. 2.

The carbon cloth refers to a cloth formed by paper-making process or weaving process using carbon fibers. In the case of the product formed by paper-making process, the carbon fibers are bonded with one another through an inorganic bonding material or the like and formed into a sheet shape. The carbon cloth preferably has a density of at least about 0.05 g/cm$^3$ and at most about 5 g/cm$^3$, and desirably has a thickness of at least about 0.1 mm and at most about 5 mm. The width of a carbon cloth is preferably at least about 5% and at most about 50% with respect to the width L (mm) of the heat insulating layers 13 on the upper and lower sides, shown in FIG. 2.

In the case where combining members such as bolts, nuts and the like are used, the density of the combining members per unit area is desirably at least about 2 pcs/m$^2$ and at most about 100 pcs/m$^2$.

In the case where the density of the combining members per unit area is at least about 2 pcs/m$^2$ and at most about 100 pcs/m$^2$, the surface of the heat insulating layers can be firmly covered with the carbon-natured sheet. Thus, silicon and the like do not enter the insulating layers through gaps to cause a reaction. Further, the number of the combining members is small and the cost can be reduced.

The lower limit value of the density of the combining members per unit area is desirably set to about 4 pcs/m$^2$, and the upper limit value thereof is desirably set to about 40 pcs/m$^2$.

Although the firing furnace 10 shown in FIG. 1 is a continuous furnace, the firing furnace of the present invention may be prepared as a batch furnace.

The ambient atmosphere of the firing furnace 10 is desirably prepared as an inert gas atmosphere, and more desirably prepared as an ambient atmosphere such as an argon gas atmosphere, a nitrogen gas and the like.

Normally, as shown in FIG. 1, a plurality of formed bodies (ceramic formed bodies) 9 to be formed into porous ceramic members are placed inside a jig for firing 15, and a plurality of the jigs for firing 15 each of which has the formed bodies 9 placed therein are superposed one upon the other to form a laminated body, and a supporting base (cart) 8 on which this laminated body is placed is transported into a firing furnace 10 to carry out a firing process. Here, the formed bodies 9 have been subjected to a degreasing process so as to eliminate resin components and the like.

The firing furnace 10 has a structure that heaters 12 are arranged above and below the muffle 11 with a predetermined gap, and the jig for firing 15 is gradually heated to a high temperature by the heaters 12 during the passage through it, and after having reached the highest temperature, the temperature is gradually lowered. Thus, the supporting base 8 on which the laminated body of the jigs for firing 15 is placed is continuously transported from an inlet into the firing furnace 10, and after having been subjected to the sintering process, the jigs for firing 15 the temperature of which is lowered are transported from an outlet to manufacture a porous ceramic member.

In the firing furnace 10 shown in FIG. 1, the heat insulating layer 13 which has the carbon-natured sheet 16 attached to the inner surface thereof is tightly fastened with the bolts 17a and the nuts 17b that serve as combining members, and also is fixedly secured to the heat insulating layer attaching-enclosing member 19. However, by fixedly securing the heat insulating layer 13 to the heat insulating layer attaching-enclosing member 19 through the combining members without using the carbon-natured sheet 16, it is also possible to prevent the warping in the heat insulating layer 13.

The combining members desirably have a density of at least about 4 pcs/m$^2$ and at most about 200 pcs/m$^2$ per unit area.

In the case where the density of the combining members per unit area is at least about 4 pcs/m$^2$ and at most about 200 pcs/m$^2$, the heat insulating layer 13 can be firmly secured; thus, warping, damages and the like hardly occur. Further, the number of combining members is small and the cost can be reduced.

The lower limit value of the density of the combining members per unit area is more desirably set to about 8 pcs/m$^2$, and the upper limit value thereof is more desirably set to about 80 pcs/m$^2$.

In the conventional firing furnace, a portion at which warping tends to occur due to a conversion of carbon members into silicon carbide is mainly located at a corner portion of the heat insulating layer. In the firing furnace of the first aspect of the present invention, since a carbon-natured sheet is placed in the vicinity of corner portions of an inner face of the heat insulating layer, the corner portion of the heat insulating layer is protected and made less susceptible to a reaction and free from occurrence of warping and corrosion; thus, it becomes possible to eliminate the necessity of exchanging members forming the heat insulating layer for a long period and, consequently, to provide a firing furnace which is excellent in durability and heat efficiency.

According to the firing furnace of the second aspect of the present invention, since the heat insulating layer is secured to a heat insulating layer attaching-enclosing member that is located on the periphery of the heat insulating layer by using a combining member, no warping occurs in the heat insulating layer and it becomes possible to provide a firing furnace which is excellent in durability.

According to the third aspect of the present invention, a firing furnace comprises a muffle formed so as to ensure a space for housing a formed body to be fired, a member that constitutes a heat generator and is placed on and/or around the muffle, and a heat insulating layer that contains the muffle and the heat generator inside thereof. Herein, the heat insulating layer is divided into a plurality of heat insulating layers, and a reinforcing member used for combining and reinforcing the heat insulating layers with each other is arranged.

In the firing furnace according to the first aspect of the present invention shown in FIG. 1, the carbon-natured sheet is placed in the vicinity of the corner portions on the inner face of the insulating layer so that occurrence of warping is prevented. However, in the third aspect of the present invention, the reinforcing member used for combining and reinforcing the heat insulating layers 13 is placed so as to prevent the warping.

Figure 8:
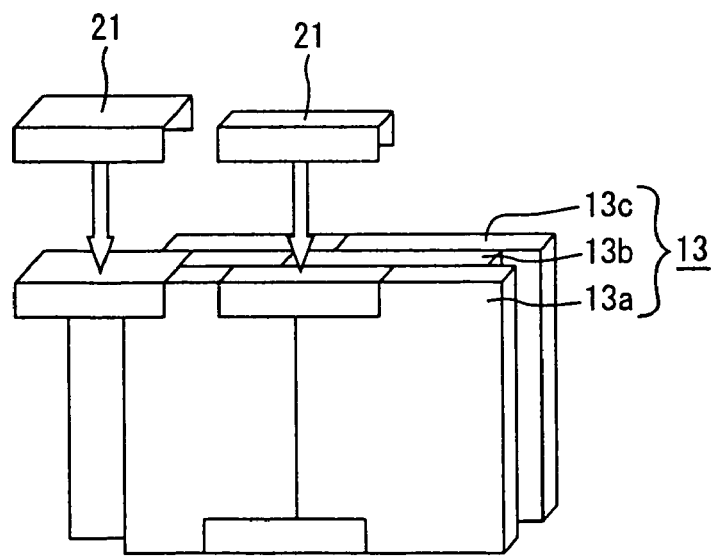
FIG. 8 is a perspective view that shows a state where reinforcing members are attached to the heat insulating layers that form a firing furnace.

FIG. 8 is a perspective view that schematically shows a part of the heat insulating layer. As shown in FIG. 8, a reinforcing member 21, which has a right angled-U figure-shape in its cross section, may be arranged on a joint portion between carbon members 13a located on the innermost side so as to reinforce the heat insulating layer, or a reinforcing member 21, which has a right angled-U figure-shape in its cross section, may be arranged in a manner so as to combine the carbon member 13a located on the innermost side with a carbon member 13b located on the outside of the carbon member 13a.

FIG. 8 shows no securing member for fixedly securing the reinforcing member 21. However, as shown in FIG. 8, the reinforcing member 21 may be placed in a manner so as to simply cover the heat insulating layer from above, or after placing the reinforcing member 21, it may be combined thereto and fixedly secured by using combining members (securing members) such as bolts, nuts and the like, or bonded by using an inorganic adhesive or the like.

Although not particularly limited, examples of the material of the reinforcing member 21 include a carbon fiber composite (C/C composite), graphite and the like. Moreover, the shape of the reinforcing member 21 may have a right angled-U figure-shape in its cross section, an L-shape in its cross section, or a plate shape. In the case where the reinforcing member 21 having the L-shape in its cross section or the plate shape is used, it needs to be fixedly secured by using combining members.

In the case where the reinforcing member 21 is used, a carbon-natured sheet is desirably placed at least in the vicinity of corner portions on the inner face of the heat insulating layer. In particular, upon manufacturing a porous ceramic material made of silicon carbide, this structure makes it possible to prevent the carbon member 13a and the like from being converted into silicon carbide through reactions.

The carbon-natured sheet may be bonded to the inner surface of the heat insulating layer 13 by using an adhesive or the like, or may be fastened to the insulating layer 13 by using the bolts 17a and the nuts 17b serving as combining members (or may be fixedly secured to a heat insulating layer attaching-enclosing member).

In the third aspect of the present invention, in the case where only the reinforcing member is placed, the density of the reinforcing member per unit area of the heat insulating member is desirably at least about 3 pcs/m$^2$ and at most about 15 pcs/m$^2$.

The area of the heat insulating layer refers to an area of a main face of the heat insulating layer, and the reinforcing member is placed in a manner so as to cover at least a part of the main face of the heat insulating layer. In this structure, the dimension of the reinforcing member that covers a part of the main face of the heat insulating layer is set in the range of about 50 to 100 mm in length as well as in the range of about 200 to 400 mm in width, and these reinforcing members are placed at the above-mentioned density.

In the case where the density of the reinforcing member per unit area in the heat insulating layer is at least about 3 pcs/m$^2$ and at most about 15 pcs/m$^2$, the heat insulating layer can be firmly secured; thus, warping and the like hardly occur. Further, the number of reinforcing members is small and the cost can be reduced.

The upper limit value of the density of the reinforcing member per unit area in the heat insulating layer is more desirably set to about 8 pcs/m$^2$. Here, the dimension of the reinforcing member to cover a part of the main face of the heat insulating layer is set in the same manner as the above-mentioned case.

In the third aspect of the present invention, when the reinforcing members are placed on the attached carbon-natured sheet so as to fixedly secure the carbon-natured sheet by the reinforcing member, the density of the reinforcing member per unit area in the heat insulating layer is desirably at least about 2 pcs/m$^2$ and at most about 15 pcs/m$^2$.

In the case where the density of the reinforcing member per unit area in the heat insulating layer is at least about 2 pcs/m$^2$ and at most about 15 pcs/m$^2$, the heat insulating layer can be firmly secured. Thus, warping and the like hardly occur. Further, the number of reinforcing members is small and the cost can be reduced.

The upper limit value of the density of the reinforcing member per unit area in the heat insulating layer is more desirably set to about 8 pcs/m$^2$.

According to the firing furnace of the third aspect of the present invention, since a reinforcing member for combining and reinforcing the heat insulating layers with each other is arranged, the heat insulating layers are secured to each other; therefore, no warping occurs in the heat insulating layer, and flaking off of the insulating layer due to corrosion and the like hardly occurs. It becomes possible to eliminate the necessity of exchanging members constituting the heat insulating layer for a long time and, consequently, to provide a firing furnace which is excellent in durability and heat efficiency.

The foregoing explanation has discussed the firing furnace having a heat generator with a heating system which applies a current to a heater (heat generating body) to generate heat. However, the firing furnaces of the first to third aspects of the present invention may adopt an induction heating system.

Figure 9:
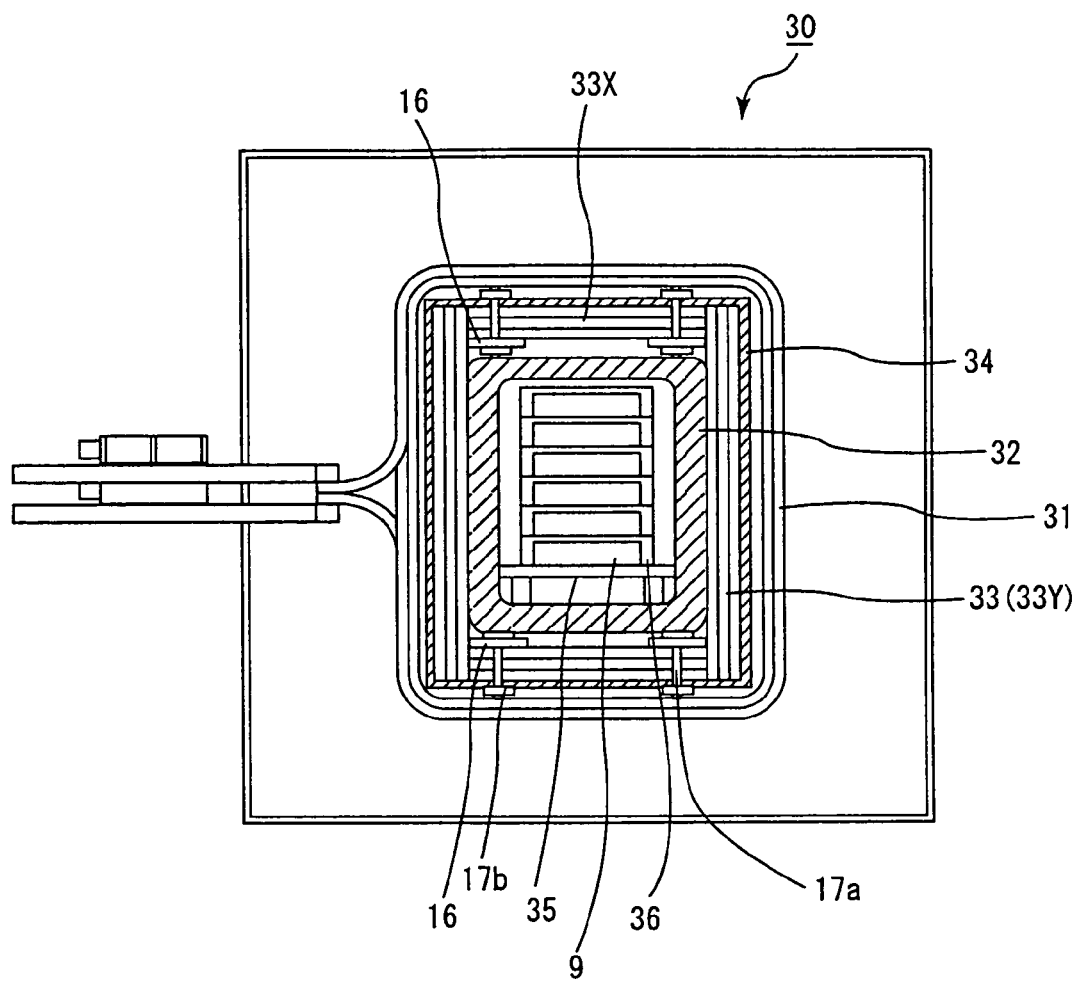
FIG. 9 is a cross-sectional view that schematically shows another example of the firing furnace of the present invention.

FIG. 9 is a cross-sectional view that schematically shows a firing furnace of the present invention in which the induction heating system is used.

This firing furnace 30 comprises a muffle 32 that is formed to ensure a space used for housing a formed body to be fired and serves as a heat generating body, a heat insulating layer 33 placed outside the muffle 32 and a coil 31 with a wire wound around a plurality of times, which is placed outside the heat insulating layer 33. Here, the heat insulating layer 33 may be placed outside the coil 31.

A carbon-natured sheet 16 is placed on inside end portions (in the vicinity of corner portions) of upper and lower heat insulating layers 33, and fixedly secured on the surface of the heat insulating layer 33 by using bolts 17a and nuts 17b that are made of carbon and serve as combining members. Moreover, the heat insulating layer 33 and the carbon-natured sheet 16 are attached to a heat insulating layer attaching-enclosing member 34 through the combining members and secured thereon.

As shown in FIG. 8, also in this firing furnace 30, a reinforcing member 21 used for combining and reinforcing the heat insulating layer 33 may be arranged.

The entire floor portion of the muffle 32 is supported by a supporting member (not shown), so that a laminated body of jigs for firing 36 in which formed bodies to be fired are placed is allowed to pass.

This firing furnace 30 has an induction heating system, and an alternating current is applied to the coil 31 so that an eddy current is generated in the muffle (heat generating body) 32 placed inside thereof; thus, the muffle (heat generating body) 32 has a temperature rise to serve as a heater.

Moreover, when an object to be heated is made of an electrically conductive material, an electric current is generated therein so that the object to be heated is allowed to generate heat.

In this firing furnace 30, the muffle (heat generating body) 32 made of carbon (graphite) is placed inside the coil 31 so that, when an alternating current is applied to the coil 31, an eddy current is generated therein to allow the muffle (heat generating body) 32 to generate heat and to heat the object to be heated such as the formed body 9 or the like.

The ambient atmosphere of the firing furnace 30 is desirably prepared as an inert gas atmosphere, such as an argon gas atmosphere, a nitrogen gas atmosphere and the like.

Normally, as shown in FIG. 9, a plurality of ceramic formed bodies to be formed into porous ceramic members are placed inside a jig for firing 13, and a plurality of the jigs for firing each of which has such formed bodies (ceramic formed bodies) 9 placed therein are superimposed on one after another to form a laminated body, and a supporting base 35 on which this laminated body is placed is transported into a firing furnace 30 to carry out a firing process. Here, the formed bodies 9 have been subjected to a degreasing process so as to eliminate resin components and the like.

The firing furnace 30 is provided with a muffle (heat generating body) 32 that generates heat upon application of a current to the coil 31 so that the jig for firing 15 is gradually heated to a high temperature during the passage through it, and after having reached the highest temperature, the temperature is gradually lowered; thus, the supporting base 35 on which the laminated body of the jigs for firing 15 is placed is continuously transported into the firing furnace 30 from an inlet, and the jigs for firing 15 the temperature of which is lowered are transported from an outlet to manufacture a porous ceramic member.

In the induction heating system, since the muffle (heat generating body) 32 can be placed in the vicinity of the object to be heated, it becomes possible to heat the object more efficiently.

In the firing furnace 30 shown in FIG. 9, heat insulating layers 33X which are placed on the upper and lower sides are not extended to respective end portions, and the four corner portions of the heat insulating layer 33 are constituted by heat insulating layers 33Y that are placed on the right and left sides. Therefore, in this mode, the end portions (corner portions) in the heat insulating layers 33Y placed on the right and left sides are secured by the insulating layers 33X placed on the upper and lower sides. Consequently, the heat insulating layers 33Y placed on the right and left sides are less likely to generate warping in which the center portion is formed into a convex portion outward. In contrast, the heat insulating layers 33X placed on the upper and lower sides are likely to generate warping in which the center portion is formed into a convex portion outward, when left as it is. Therefore, by using combining members, the end portions (in the vicinity of corner portions) of the heat insulating layers 33X placed on the upper and lower sides are fixedly secured so that the occurrence of warping is prevented.

Therefore, in the case where the four corner portions of the heat insulating layers 33 are constituted by heat insulating layers 33X that are placed on the upper and lower sides, the heat insulating layers 33Y placed on the right and left sides are more likely to generate warping. Accordingly, portions close to the corner portions of the heat insulating layers 33X placed on the right and left sides are desirably secured by using a combining member.

Also in the heat insulating layers 33 shown in FIG. 9, in the same manner as the heat insulating layers shown in FIGS. 3 to 7, a carbon sheet may be placed on entire inner faces of the heat insulating layer on the upper and lower sides, or a carbon sheet may be placed on the entire portion or one portion of inner faces of the heat insulating layers on the right and left sides, or a carbon sheet having an approximately L-shape may be placed on corner portions of the heat insulating layer, or a carbon sheet may be placed on the entire inner face of the heat insulating layer.

Ceramic materials to be manufactured by using the firing furnaces according to the first to third aspects of the present invention are not particularly limited, and various ceramic products may be listed. One of those is a porous ceramic member to be used as a filter or a catalyst supporting member. With respect to the material for the porous ceramic member, examples thereof include oxide ceramics such as cordierite, alumina, silica, mullite, and aluminum titanate, carbide ceramics such as silicon carbide, zirconium carbide, titanium carbide, tantalum carbide, and tungsten carbide, nitride ceramics such as aluminum nitride, silicon nitride, boron nitride, and titanium nitride, a composite of silicon carbide and silicon, and the like. Among these, non-oxide ceramics, such as carbide ceramics and nitride ceramics, which have high heat resistance, superior mechanical properties and a high thermal conductivity, are desirably used, and among the non-oxide ceramics, silicon carbide is more preferably used.

With respect to the application of the porous ceramic member, as described earlier, for example, a ceramic filter, a catalyst supporting member and the like used for purifying exhaust gases discharged from an internal combustion engine such as a diesel engine are listed.

Here, the porous ceramic member to be used as the ceramic filter, the catalyst supporting member and the like is referred to as a honeycomb structural body.

In the following, explanation will be given of a honeycomb structural body to be manufactured by using the above-mentioned firing furnace and a manufacturing method thereof including the firing processes thereof.

The honeycomb structural body has a structure that a plurality of pillar-shaped porous ceramic members each having a large number of throughholes placed in parallel with one another in the length direction with a partition wall interposed therebetween are bound to one another through a sealing material layer.

Figure 10:
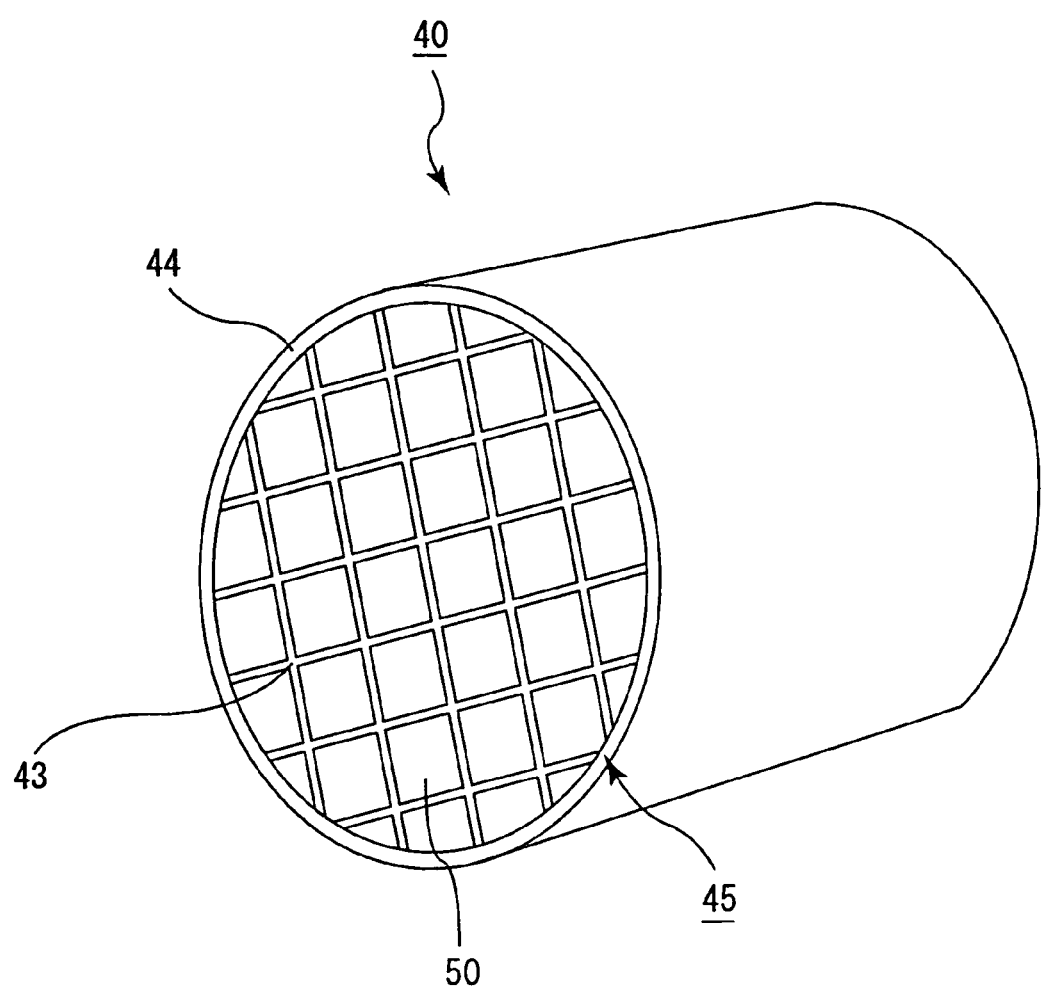
FIG. 10 is a perspective view that schematically shows a honeycomb structural body manufactured by using porous ceramic bodies made of silicon carbide.

FIG. 10 is a perspective view that schematically shows one example of the honeycomb structural body.

Figure 11A:
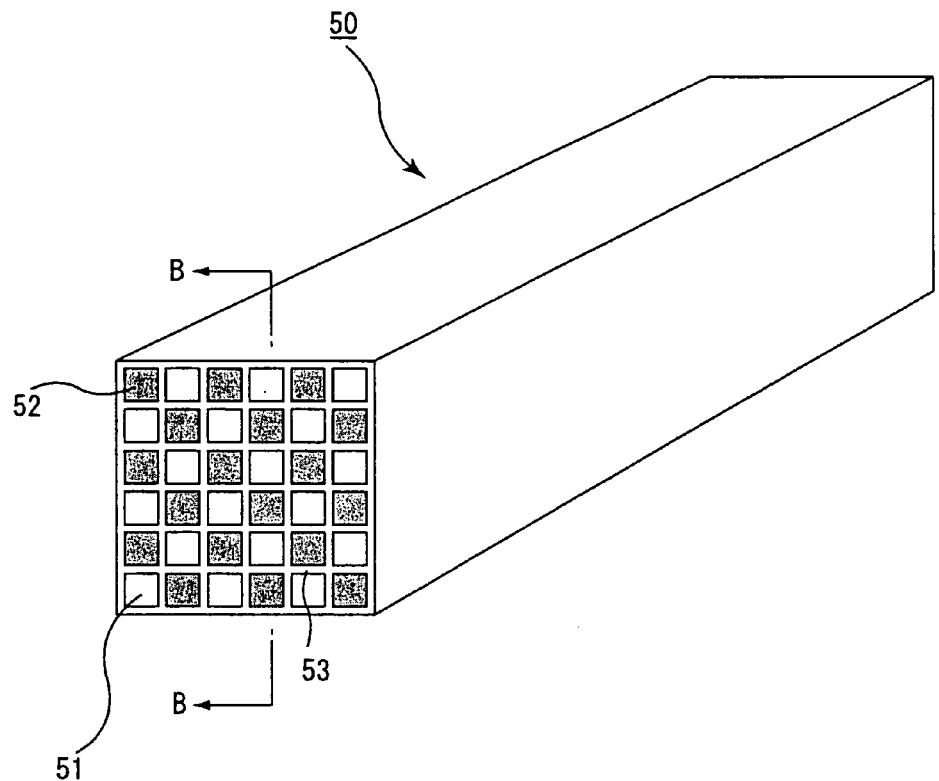
FIG. 11A is a perspective view that schematically shows a porous ceramic member.
Figure 11B:
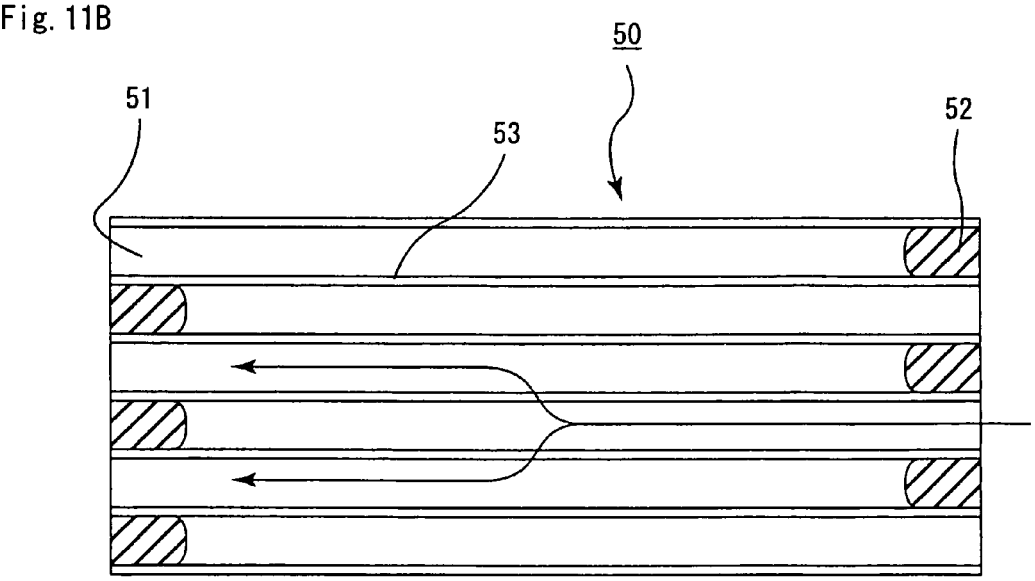
FIG. 11B is a cross-sectional view taken along line B-B of FIG. 11A.

FIG. 11A is a perspective view that schematically shows a porous ceramic member to be used for the honeycomb structural body shown in FIG. 10, and FIG. 11B is a cross-sectional view taken along line B-B of the porous ceramic member shown in FIG. 11A.

The honeycomb structural body 40 has a structure that a plurality of porous ceramic members 50 made of silicon carbide are bound to one another through a sealing material layer 43 to form a ceramic block 45, and a sealing material layer 44 is formed on the circumference of this ceramic block 45. Here, the porous ceramic member 50 has a structure that a large number of through holes 51 are placed in parallel with one another in the length direction so that a partition wall 53 separating the through holes 51 is allowed to function as a particle collecting filter.

In other words, as shown in FIG. 11B, each of the through holes 51 that are formed in the porous ceramic member 50 made of porous silicon carbide is sealed with a plug 52 at either one of ends on its exhaust gas inlet side and exhaust gas outlet side so that exhaust gases that have entered one through hole 51 are discharged from another through hole 51 after having always passed through each partition wall 53 that separates the through holes 51. Thus, when the exhaust gases pass through the partition wall 53, particulates are captured by the partition wall 53 so that the exhaust gases are purified.

Since the honeycomb structural body 40 of this type has superior heat resistance and provides easy regenerating processes and the like, it has been applied to various large-size vehicles and vehicles with diesel engines.

The sealing material layer 43, which is placed between the porous ceramic members 50, and serves as an adhesive layer used for bonding the porous ceramic members 50 to each other, is also allowed to serve as a filter. With respect to the material for the sealing material layer 43, although not particularly limited, approximately the same material as the porous ceramic member 50 is desirably used.

The sealing material layer 44, formed on the periphery of the ceramic block 45, is used for preventing leak of exhaust gases from the peripheral portion of the ceramic block 45, when the honeycomb structural body 40 is placed in an exhaust passage of an internal combustion engine. With respect to the material for the sealing material layer 44, although not particularly limited, approximately the same material as the porous ceramic member 50 is desirably used.

Here, with respect to the porous ceramic member 50, the end portions of the through holes need not necessarily be sealed, and when not sealed, the honeycomb structural body can be used as a catalyst supporting member on which, for example, a catalyst for converting exhaust gasses is supported.

The porous ceramic member shown in FIGS. 11A and 11B is mainly composed of silicon carbide. However, this may be composed of silicon-containing ceramics formed by blending metal silicon in silicon carbide or ceramics combined with silicon and silicate compound. As described above, this may be composed of carbide ceramics other than silicon carbide, nitride ceramics, or oxide ceramics. Here, if necessary, metal silicon may be added thereto so as to be set in the range of about 0% to about 45% by weight with respect to the total weight.

The average pore diameter of the porous ceramic 50 is desirably set in the range of about 5 to 100 μm. The average pore diameter of less than about 5 μm tends to cause particulates to easily clog the pores. In contrast, the average pore diameter exceeding about 100 μm tends to cause particulates to pass through the pores; thus, the particulates cannot be collected, making the porous ceramic unable to function as a filter.

Although not particularly limited, the porosity of the porous ceramic member 50 is desirably set to about 40% to 80%. When the porosity is less than about 40%, particulates tend to cause clogging. In contrast, the porosity exceeding about 80% causes degradation in the strength of the pillar-shaped body; thus, it might be easily broken.

With respect to the particle diameter of ceramic particles to be used upon manufacturing the porous ceramic members 50, although not particularly limited, those which are less likely to shrink in the succeeding firing process are desirably used, and for example, those particles, prepared by combining 100 parts by weight of ceramic powders having an average particle diameter of about 0.3 to 50 μm with about 5 to 65 parts by weight of ceramic powders having an average particle diameter of about 0.1 to 1.0 μm, are desirably used. By mixing ceramic powders having the above-mentioned respective particle sizes at the above-mentioned blending ratio, it becomes possible to manufacture a pillar-shaped body made of porous ceramics.

Moreover, the shape of the honeycomb structural body 40 is not limited to the cylindrical shape shown in FIG. 1, and any desired shape, such as a pillar shape with a flattened shape in its cross section like an elliptical pillar shape and a rectangular pillar shape may be used.

Here, the honeycomb structural body 40 can be used as a catalyst supporting member, and in this case, a catalyst (catalyst for converting exhaust gasses) used for converting exhaust gases is supported on the honeycomb structural body.

By using the honeycomb structural body as a catalyst supporting member, toxic components in exhaust gases such as HC, CO, NOx and the like and HC and the like derived from organic components slightly contained in the honeycomb structural body can be surely converted.

The catalyst for converting exhaust gases is not particularly limited, and examples thereof include noble metals such as platinum, palladium, and rhodium. Each of these noble metals may be used alone, or two or more kinds of these may be used in combination.

In the following, explanation will be given of a method for manufacturing the honeycomb structural body.

Herein, explanation will be given of a manufacturing method of a honeycomb structural body that uses the porous ceramic member 50 made of silicon carbide as its constituent member; however, the material for the porous ceramic member is not particularly limited.

More specifically, a ceramic laminated body to form a ceramic block 45 is formed (see FIG. 10).

The ceramic laminated body has a pillar structure in which a plurality of pillar-shaped porous ceramic members 50 are bound to one another through a sealing material layer 43.

In order to manufacture the porous ceramic member 50 made of silicon carbide, a mixed composition, prepared by adding a binder and a dispersant solution to silicon carbide powder, is first mixed by an attritor or the like and sufficiently kneaded by a kneader or the like, and then extrusion-formed so that a pillar-shaped formed body having approximately the same shape as the porous ceramic member 50 shown in FIG. 11A is formed.

With respect to the particle diameter of the silicon carbide powder, although not particularly limited, that which is less likely to shrink in the succeeding firing process is preferable, and for example, silicon carbide powders, prepared by combining 100 parts by weight of powders having an average particle diameter of about 0.3 to 50 μm with about 5 to 65 parts by weight of powders having an average particle diameter of about 0.1 to 1.0 μm, are desirably used.

The above-mentioned binder is not particularly limited, and examples thereof include methylcellulose, carboxymethyl cellulose, hydroxyethyl cellulose, polyethylene glycol, phenolic resin, epoxy resin and the like.

In general, the blending amount of the above-mentioned binder is preferably set to about 1 to 10 parts by weight with respect to 100 parts by weight of the silicon carbide powder.

The dispersant solution is not particularly limited, and examples thereof include an organic solvent such as benzene, alcohol such as methanol, water and the like.

An appropriate amount of the above-mentioned dispersant solution is mixed therein so that the viscosity of the mixed composition is set within a fixed range.

Next, the silicon carbide formed body is dried and, if necessary, a mouth-sealing process is carried out so that predetermined through holes are filled with plugs, and the resulting formed body is again subjected to a drying process.

Next, the resulting silicon carbide formed body is heated at about 400° C. to 650° C. in an oxygen-containing atmosphere so as to be degreased, and heated at about 1400° C. to 2200° C. in an inert gas atmosphere such as nitrogen or argon to be fired so that the ceramics powder is sintered to manufacture a porous ceramic member 50 made of silicon carbide.

Upon carrying out the firing process, any one of the firing furnaces according to the first to third aspects of the present invention is used.

In other words, any one of the following furnaces is used: the firing furnace according to the first aspect of the present invention that comprises a muffle formed so as to ensure a space for housing a formed body to be fired, a member that constitutes a heat generator and is placed on and/or around the muffle, and a heat insulating layer that contains the muffle and the heat generator inside thereof, in which a carbon-natured sheet placed in the vicinity of corner portions of an inner face of the heat insulating layer; the firing furnace according to the second aspect of the present invention that comprises a muffle formed so as to ensure a space for housing a formed body to be fired, a member that constitutes a heat generator and is placed on and/or around the muffle, and a heat insulating layer that contains the muffle and the heat generator inside thereof, in which the heat insulating layer being secured to a heat insulating layer attaching-enclosing member that is located on the periphery of the heat insulating layer by using a combining member; and the firing furnace according to the third aspect of the present invention that comprises a muffle formed so as to ensure a space for housing a formed body to be fired, a member that constitutes a heat generator and is placed on and/or around the muffle, and a heat insulating layer that contains the muffle and the heat generator inside thereof, in which the heat insulating layer divided into a plurality of heat insulating layers while a reinforcing member that combines and reinforces the divided insulating layers is arranged therein.

In the firing process, the heating processes are carried out at the above-mentioned temperatures; thus, SiO, Si and SiC contained in the silicon carbide formed body are evaporated to cause a warping in the heat insulating layer. However, in the first to third aspects of the present invention, since the portion in the heat insulating layer at which the warping occurs is covered with a carbon-natured sheet or since the portion is firmly secured so as to prevent the warping, no warping occurs in the heat insulating layer. Thus, the same firing furnace can be used for a long time, thereby making it possible to manufacture a porous ceramic member under the same conditions with high reproducibility. Moreover, each of the firing furnaces of the first to third aspects of the present invention may be prepared as a continuous furnace, and a porous ceramic member 50 can be continuously manufactured.

Thereafter, a plurality of porous ceramic members 50, thus manufactured, are bound to one another through a sealing material layer 43, and after this has been machined into a predetermined shape, a sealing material layer 34 is formed on the periphery thereof; thus, manufacturing processes of the honeycomb structural body are completed.

According to the porous ceramic member manufacturing methods of the fourth to sixth aspects of the present invention, the firing furnace according to any one of the first to third aspects of the present invention is used upon firing a formed body to form the porous ceramic member. Thus, it is possible to carry out the firing process under a stable condition, and to manufacture porous ceramic members having superior properties under the same condition with high reproducibility, while preventing impurities derived from warping and corrosion in the heat insulating layer from contaminating the product.

According to the seventh to ninth aspects of the present invention, since the firing furnace according to any one of the first to third aspects of the present invention is used upon firing a formed body to form the porous ceramic member, the porous ceramic member can be free from contamination with impurities derived from warping and corrosion in the heat insulating layer, can be manufactured with a high reproducibility, and has excellent properties.

EXAMPLES

In the following, explanation will be given of specific examples; however, the present invention is not intended to be limited only by these examples.

Example 1

(1) Powders of α-type silicon carbide having an average particle diameter of 10 μm (60% by weight) and powders of α-type silicon carbide having an average particle diameter of 0.5 μm (40% by weight) were wet-mixed, and to 100 parts by weight of the resulting mixture were added and kneaded 5 parts by weight of an organic binder (methyl cellulose) and 10 parts by weight of water to obtain a mixed composition. Next, after a slight amount of a plasticizer and a lubricant had been added and kneaded therein, the resulting mixture was extrusion-formed to form a raw formed product.

Next, after the above-mentioned raw formed product had been dried by using a microwave drier or the like to form a ceramic dried body, predetermined through holes were filled with a paste having the same composition as the raw formed product. After having been again dried by using a drier, the resulting product was degreased at 400° C., and fired at 2200° C. in a normal-pressure argon atmosphere for 3 hours to manufacture a porous ceramic member having a shape as shown in FIG. 11A, which was a silicon carbide sintered body having a size of 34 mm×34 mm×300 mm, the number of through holes of 31 pcs/cm$^2$ and a thickness of partition wall of 0.3 mm.

When the firing process was carried out, a firing furnace in which carbon-natured sheets (FGL-253C (cloth), made by Nippon Carbon Co., Ltd., density: 0.16 g/cm$^3$) were placed on end portions of an inner face of upper and lower heat insulating layers as shown in FIG. 1 was used.

Thereafter, the method, described in "DESCRIPTION OF THE EMBODIMENTS", was used to manufacture a honeycomb structural body 40 in which a plurality of porous ceramic members 50 made of silicon carbide, shown in FIG. 10, were bound with one another through a sealing material layer 43 to form a ceramic block 45, and a sealing material layer 44 was formed on the periphery of the ceramic block 45.

Moreover, the above-mentioned firing furnace was used to continuously carry out the manufacturing processes of the porous ceramic members for 1000 hours, and the heat insulating layers constituting the firing furnace were observed for any warping; however, no warping was found in the heat insulating layers.

The honeycomb structural body in which the porous ceramic members thus manufactured were used was able to sufficiently satisfy properties as a filter, and the honeycomb structural body, which was manufactured by using porous ceramic members that were continuously manufactured, had no change in characteristics as the honeycomb structural body.

Example 2

The same processes as Example 1 were carried out except that DON-3000 (graphite foil, made by Donack Co., Ltd., density: 0.15 g/cm$^3$) was used as the carbon-natured sheets to be placed on end portions of the inner face of upper and lower heat insulating layers that constitute the firing furnace to manufacture porous ceramic members, and the resulting porous ceramic members were used to manufacture a honeycomb structural body. In this case, the processes used for manufacturing the porous ceramic members were continuously repeated for 1000 hours in the same manner as Example 1, and the heat insulating layers constituting the firing furnace were observed for any warping.

As a result, no warping was observed in the same manner as Example 1.

The honeycomb structural body in which the porous ceramic members thus manufactured were used was able to sufficiently satisfy properties as a filter, and the honeycomb structural body, which was manufactured by using porous ceramic members that were continuously manufactured, had no change in characteristics as the honeycomb structural body.

Example 3

The same processes as Example 1 were carried out except that no carbon-natured sheets were placed on end portions of the inner face of upper and lower heat insulating layers that constitute the firing furnace, with the heat insulating layers 13 being secured to a heat insulating layer attaching-enclosing member 19 with bolts 17$a$ and nuts 17$b$ serving as combining members, to manufacture porous ceramic members and a honeycomb structural body formed thereby.

In this case, the process used for manufacturing the porous ceramic members were continuously carried out for 1000 hours in the same manner as Example 1, and after a lapse of 700 hours as well as after a lapse of 1000 hours, the heat insulating layers forming the firing furnace were observed for any warping. As a result, no warping was observed in the heat insulating layers in any of the lapses of time.

The honeycomb structural body in which the porous ceramic members thus manufactured were used was able to sufficiently satisfy properties as a filter, and the honeycomb structural body, which was manufactured by using porous ceramic members that were continuously manufactured, had no change in characteristics as the honeycomb structural body.

Incidentally, the density per unit area of the combining members was 4 pcs/m$^2$.

Example 4

The same processes as Example 1 were carried out except that no carbon-natured sheets were placed on end portions of the inner face of upper and lower heat insulating layers that constitute the firing furnace, with the heat insulating layers 13 being secured to a heat insulating layer attaching-enclosing member 19 with bolts 17$a$ and nuts 17$b$ serving as combining members, to manufacture porous ceramic members and a honeycomb structural body formed thereby.

In this case, the process used for manufacturing the porous ceramic members were continuously carried out for 1000 hours in the same manner as Example 1, and after a lapse of 700 hours as well as after a lapse of 1000 hours, the heat insulating layers forming the firing furnace were observed for any warping. As a result, no warping was observed in the heat insulating layers in any of the lapses of time.

The honeycomb structural body in which the porous ceramic members thus manufactured were used was able to sufficiently satisfy properties as a filter, and the honeycomb structural body, which was manufactured by using porous ceramic members that were continuously manufactured, had no change in characteristics as the honeycomb structural body.

Incidentally, the density per unit area of the combining member was 100 pcs/m$^2$.

Example 5

The same processes as Example 1 were carried out except that a reinforcing member 21 made of a carbon fiber composite material (C/C composite) (K-200, made by Kureha Chemical Industry Co., Ltd., density: 1.75 g/ml) was attached to a joint portion of heat insulating layers that constitute a firing furnace, as shown in FIG. 8, to manufacture porous ceramic members, and a honeycomb structural body was manufactured by using the resulting porous ceramic members; thus, the above-mentioned firing furnace was used to continuously carry out the manufacturing processes in the same manner as Example 1, and the heat insulating layers forming the firing furnace were observed for any warping.

As a result, no warping was found in any portion of the heat insulating layers.

The honeycomb structural body in which the porous ceramic members thus manufactured were used was able to sufficiently satisfy properties as a filter, and the honeycomb structural body, which was manufactured by using porous ceramic members that were continuously manufactured, had no change in characteristics as the honeycomb structural body.

Example 6

The same processes as Example 1 were carried out except that, upon firing, carbon-natured sheets 160 (FGL-253C (cloth), made by Nippon Carbon Co., Ltd.; density: 0.16 g/cm$^3$) were placed in the vicinity of end portions of an inner face of heat insulating layers 63Y on the right and left side faces as shown in FIG. 3, with the heat insulating layers 63Y and the carbon-natured sheets 160 being secured to a heat insulating layer attaching-enclosing member 19 with combining members 17, to manufacture porous ceramic members, and a honeycomb structural body was manufactured by using the resulting porous ceramic members; thus, the above-mentioned firing furnace was used to continuously carry out the manufacturing processes for 1000 hours, and the heat insulating layers 63 constituting the firing furnace were observed for any warping.

As a result, no warping was found in the heat insulating layers 63.

The honeycomb structural body in which the porous ceramic members thus manufactured were used was able to sufficiently satisfy properties as a filter, and the honeycomb structural body, which was manufactured by using porous ceramic members that were continuously manufactured, had no change in characteristics as the honeycomb structural body.

Incidentally, the density per unit area of the combining member was 4 pcs/m$^2$.

Example 7

The same processes as Example 1 were carried out except that, upon firing, approximately L-shaped carbon-natured sheets 161 (FGL-253C (cloth), made by Nippon Carbon Co., Ltd.; density: 0.16 g/cm$^3$) were placed at four corners of an inner face of a heat insulating layer 13 as shown in FIG. 4, with the heat insulating layer 13 and the carbon-natured sheets 161 being secured to a heat insulating layer attaching-enclosing member 19 with combining members 17, to manufacture porous ceramic members, and a honeycomb structural body was manufactured by using the resulting porous ceramic members; thus, the above-mentioned firing furnace was used to continuously carry out the manufacturing processes for 1000 hours, and the heat insulating layers 13 constituting the firing furnace were observed for any warping.

As a result, no warping was found in the heat insulating layers 13.

The honeycomb structural body in which the porous ceramic members thus manufactured were used was able to sufficiently satisfy properties as a filter, and the honeycomb structural body, which was manufactured by using porous ceramic members that were continuously manufactured, had no change in characteristics as the honeycomb structural body.

Incidentally, the density per unit area of the combining member was 4 pcs/m$^2$.

Example 8

The same processes as Example 1 were carried out except that, upon firing, carbon-natured sheets 162 (FGL-253C (cloth), made by Nippon Carbon Co., Ltd.; density: 0.16 g/cm$^3$) were placed over the entire inner faces of upper and lower heat insulating layers 13, as shown in FIG. 5, with the carbon-natured sheets 162 and the heat insulating layers 13 being secured to a heat insulating layer attaching-enclosing member 19 with combining members 17, to manufacture porous ceramic members, and a honeycomb structural body was manufactured by using the resulting porous ceramic members; thus, the above-mentioned firing furnace was used to continuously carry out the manufacturing processes for 1000 hours, and the heat insulating layers 13 constituting the firing furnace were observed for any warping.

As a result, no warping was found in the heat insulating layers 13.

The honeycomb structural body in which the porous ceramic members thus manufactured were used was able to sufficiently satisfy properties as a filter, and the honeycomb structural body, which was manufactured by using porous ceramic members that were continuously manufactured, had no change in characteristics as the honeycomb structural body.

Incidentally, the density per unit area of the combining member was 4 pcs/m$^2$.

Example 9

The same processes as Example 1 were carried out except that, upon firing, carbon-natured sheets 163 (FGL-253C (cloth), made by Nippon Carbon Co., Ltd., density: 0.16 g/cm$^3$) were placed over the entire inner faces of insulating layers 63Y on right and left side faces, as shown in FIG. 6, with the carbon-natured sheets 163 and the heat insulating layers 63Y being secured to a heat insulating layer attaching-enclosing member 19 with combining members 17, to manufacture porous ceramic members, and a honeycomb structural body was manufactured by using the resulting porous ceramic members; thus, the above-mentioned firing furnace was used to continuously carry out the manufacturing processes for 1000 hours, and the heat insulating layers 63Y constituting the firing furnace were observed for any warping.

As a result, no warping was found in the heat insulating layers 63Y.

The honeycomb structural body in which the porous ceramic members thus manufactured were used was able to sufficiently satisfy properties as a filter, and the honeycomb structural body, which was manufactured by using porous ceramic members that were continuously manufactured, had no change in characteristics as the honeycomb structural body.

Incidentally, the density per unit area of the combining members was 4 pcs/m$^2$.

Example 10

The same processes as Example 1 were carried out except that, upon firing, carbon-natured sheets 164 (FGL-253C (cloth), made by Nippon Carbon Co., Ltd.; density: 0.16 g/cm$^3$) were placed over the entire inner faces of the heat insulating layer 13, as shown in FIG. 7, with the carbon-natured sheets 164 and the heat insulating layer 13 being secured to a heat insulating layer attaching-enclosing member 19 with combining members 17, to manufacture porous ceramic members, and a honeycomb structural body was manufactured by using the resulting porous ceramic members; thus, the above-mentioned firing furnace was used to continuously carry out the manufacturing processes for 1000 hours, and the heat insulating layer 13 constituting the firing furnace were observed for any warping.

As a result, no warping was found in the heat insulating layer 13.

The honeycomb structural body in which the porous ceramic members thus manufactured were used was able to sufficiently satisfy properties as a filter, and the honeycomb structural body, which was manufactured by using porous ceramic members that were continuously manufactured, had no change in characteristics as the honeycomb structural body.

Incidentally, the density per unit area of the combining member was 4 pcs/m$^2$.

Reference Example 1

The same processes as Example 1 were carried out except that no carbon-natured sheets were placed on end portions of the inner face of upper and lower heat insulating layers that constitute the firing furnace, with the heat insulating layers 13 being secured to a heat insulating layer attaching-enclosing member 19 with bolts 17a and nuts 17b serving as combining members, to manufacture porous ceramic members and a honeycomb structural body formed thereby.

In this case, the process used for manufacturing the porous ceramic members were continuously carried out for 1000 hours in the same manner as Example 1, and after a lapse of 700 hours as well as after a lapse of 1000 hours, the heat insulating layers forming the firing furnace were observed for any warping. As a result, no warping was observed in the heat insulating layers after the lapse of 700 hours; however, a warping was observed in the heat insulating layers after the lapse of 1000 hours.

The honeycomb structural body in which the porous ceramic members thus manufactured were used was able to sufficiently satisfy properties as a filter, and the honeycomb structural body, which was manufactured by using porous ceramic members that were continuously manufactured, had no change in characteristics as the honeycomb structural body.

Incidentally, the density per unit area of the combining member was 2 pcs/m$^2$.

Comparative Example 1

The same processes as Example 1 were carried out except that a conventional firing furnace in which no carbon-natured sheets were placed on end portions of an inner face of upper and lower heat insulating layers was used to manufacture porous ceramic members, and a honeycomb structural body was manufactured by using the resulting porous ceramic members.

As a result, after the lapse of 700 hours, a warping occurred, and when the manufacturing processes were continuously carried out, flaking off of the insulating layer occurred after the lapse of 2000 hours.

As clearly indicated by the above-mentioned Examples, the present invention is desirably applied to a manufacturing method of a honeycomb structural body made of non-oxide based ceramics.

What is claimed as new and desired to be secured by Letters Patent of the United States is:

1. A firing furnace comprising:
    a muffle formed so as to ensure a space for housing a formed body to be fired;
    a member that constitutes a heat generator and is placed on and/or around the muffle; and
    a heat insulating layer that contains said muffle and said heat generator inside thereof,
    wherein
    a carbon-natured sheet is placed in the vicinity of corner portions of an inner face of said heat insulating layer, and
    said carbon-natured sheet is secured to an inner face of the heat insulating layer by using a combining member extending through the carbon-natured sheet and connecting to the heat insulating layer.

2. The firing furnace according to claim 1,
    wherein
    the carbon-natured sheet is placed on inner upper and lower faces of said heat insulating layer.

3. The firing furnace according to claim 1,
    wherein
    the carbon-natured sheet is placed on inner side faces of said heat insulating layer.

4. The firing furnace according to claim 1,
    wherein
    the carbon-natured sheet is placed on entire inner faces of said heat insulating layer.

5. The firing furnace according to claim 1,
    wherein
    said carbon-natured sheet is made of a graphite sheet, a carbon fiber composite or a carbon cloth.

6. The firing furnace according to claim 1,
    wherein
    said combining member has a density of at least about 2 pcs/m$^2$ and at most about 100 pcs/m$^2$ per unit area.

7. The firing furnace according to claim 1,
    wherein
    said carbon-natured sheet is secured to an inner face of the heat insulating layer by using an adhesive.

8. The firing furnace according to claim 1,
    wherein
    the member that constitutes said heat generator is a heater or a muffle.

9. The firing furnace according to claim 1,
    wherein
    said heat insulating layer is secured to a heat insulating layer attaching-enclosing member that is located on the periphery of the heat insulating layer by using a combining member.

10. The firing furnace according to claim 9,
    wherein
    said combining member has a density of at least about 4 pcs/m$^2$ and at most about 200 pcs/m$^2$ per unit area.

11. The firing furnace according to claim 9,
    wherein
    the member that constitutes said heat generator is a heater or a muffle.

12. The firing furnace according to claim 1,
    wherein
    said heat insulating layer is divided into a plurality of heat insulating layers
    while a reinforcing member that combines and reinforces said divided insulating layers is arranged therein.

13. The firing furnace according to claim 12,
    wherein
    said reinforcing member is made of a carbon fiber composite or graphite.

14. The firing furnace according to claim 12,
    wherein
    a carbon-natured sheet is placed at least in the vicinity of corner portions of an inner face of said heat insulating layer.

15. The firing furnace according to claim 12,
    wherein
    a carbon-natured sheet is placed on inner upper and lower faces of said heat insulating layer.

16. The firing furnace according to claim 12,
    wherein
    a carbon-natured sheet is placed on inner side faces of said heat insulating layer.

17. The firing furnace according to claim 12,
    wherein
    a carbon-natured sheet is placed on entire inner faces of said heat insulating layer.

18. The firing furnace according to any of claims 14 to 17,
    wherein
    said carbon-natured sheet is made of a graphite sheet, a carbon fiber composite or a carbon cloth.

19. The firing furnace according to claim 12, wherein
the member that constitutes said heat generator is a heater or a muffle.

20. The firing furnace according to claim 1, wherein said combining member comprises a bolt and a nut.

21. The firing furnace according to claim 1, wherein said combining member is made of carbon.

22. A porous ceramic member manufacturing method, comprising
housing a formed body to be fired in the space within the muffle of a firing furnace according to any one of claims 1-5, 6-17, 19, and 21, and then
firing said formed body to form a porous ceramic member.

* * * * *